United States Patent
Du et al.

(10) Patent No.: US 9,665,952 B2
(45) Date of Patent: May 30, 2017

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Yaojiang Du, Beijing (CN); Hua Cai, Beijing (CN); Long Meng, Beijing (CN); Xu Han, Beijing (CN); Jia Qu, Beijing (CN); Yan Wang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 54 days.

(21) Appl. No.: 14/499,749

(22) Filed: Sep. 29, 2014

(65) Prior Publication Data
US 2015/0235387 A1     Aug. 20, 2015

(30) Foreign Application Priority Data

Feb. 19, 2014   (CN) .......................... 2014 1 0056677
Feb. 21, 2014   (CN) .......................... 2014 1 0060354
Mar. 14, 2014   (CN) .......................... 2014 1 0097791

(51) Int. Cl.
*G09G 5/00*     (2006.01)
*G06T 11/00*     (2006.01)
(Continued)

(52) U.S. Cl.
CPC .......... *G06T 11/001* (2013.01); *G06F 3/0488* (2013.01); *G06F 3/04842* (2013.01); *G06F 3/04847* (2013.01); *G06F 21/36* (2013.01)

(58) Field of Classification Search
None
See application file for complete search history.

(56) References Cited

U.S. PATENT DOCUMENTS 8,904,479 B1 *   12/2014   Johansson ............... G06F 21/36
                                           382/181
2011/0072373 A1 *   3/2011   Yuki ................... G06F 3/04817
                                           715/764
(Continued)

FOREIGN PATENT DOCUMENTS

CN        101707647 A      5/2010
CN        101867659 A     10/2010
(Continued)

OTHER PUBLICATIONS

First Chinese Office Action regarding Application No. 201410097791.4 dated May 23, 2016. English translation provided by Unitalen Attorneys at Law.

(Continued)

*Primary Examiner* — Barry Drennan
*Assistant Examiner* — Khoa Vu
(74) *Attorney, Agent, or Firm* — Harness, Dickey & Pierce, P.L.C.

(57) ABSTRACT

An information processing method and an electronic device are provided in the present disclosure. The method includes: acquiring an adjustment instruction to an icon object in a display content, where the adjustment instruction includes parameter information, a display mode of at least one of the icon object of a first type and the icon object of a second type is determined according to the parameter information, the icon object of a first type is configured to carry the icon object of a second type; adjusting the icon object in the display content based on the parameter information in response to the adjustment instruction to make the icon object present an adjusted display effect via the display unit.

26 Claims, 15 Drawing Sheets

(51) Int. Cl.
*G06F 3/0484* (2013.01)
*G06F 3/0488* (2013.01)
*G06F 21/36* (2013.01)

(56) References Cited

U.S. PATENT DOCUMENTS

| | | | |
|---|---|---|---|
| 2012/0036480 A1* | 2/2012 | Warner | G06F 3/04847 715/833 |
| 2013/0063741 A1* | 3/2013 | Miyazaki | H04N 1/6011 358/1.9 |
| 2013/0235069 A1* | 9/2013 | Ubillos | G09G 5/026 345/594 |
| 2014/0115540 A1* | 4/2014 | Ikeda | G06F 3/0488 715/835 |
| 2014/0317723 A1* | 10/2014 | Hicks | G06F 21/36 726/19 |
| 2015/0082231 A1 | 3/2015 | Ren et al. | |

FOREIGN PATENT DOCUMENTS

| | | |
|---|---|---|
| CN | 101944057 A | 1/2011 |
| CN | 102033860 A | 4/2011 |
| CN | 103257796 A | 8/2013 |
| CN | 103309578 A | 9/2013 |
| CN | 103500049 A | 1/2014 |
| CN | 103544004 A | 1/2014 |
| CN | 103558960 A | 2/2014 |

OTHER PUBLICATIONS

First Chinese Office Action regarding Application No. 201410060354.5 dated May 5, 2016. English translation provided by Unitalen Attorneys at Law.

* cited by examiner

INFORMATION PROCESSING METHOD AND ELECTRONIC DEVICE

The present application claims the priority to Chinese Patent Application No. 201410060354.5, entitled as "INFORMATION PROCESSING METHOD AND ELECTRONIC DEVICE", filed on Feb. 21, 2014 with State Intellectual Property Office of People's Republic of China, which is incorporated herein by reference in its entirety.

The present application claims the priority to Chinese Patent Application No. 201410056677.7, entitled as "INFORMATION PROCESSING METHOD AND ELECTRONIC DEVICE", filed on Feb. 19, 2014 with State Intellectual Property Office of People's Republic of China, which is incorporated herein by reference in its entirety.

The present application claims the priority to Chinese Patent Application No. 201410097791.4, entitled as "INFORMATION PROCESSING METHOD AND ELECTRONIC DEVICE", filed on Mar. 14, 2014 with State Intellectual Property Office of People's Republic of China, which is incorporated herein by reference in its entirety.

BACKGROUND

Technical Field

The present disclosure relates to the field of electronic device application, and particularly to an information processing method and an information processing electronic device.

Related Art

With the development of smart phones, more and more applications are developed and provided to users to use. Generally, when a certain application is enabled by a user, the client needs to light the phone screen, then clicks on a corresponding application menu and selects the application to be enabled in the application menu. For example, if the user needs to change the color of the desktop, the user lights the phone screen, enters a phone setting menu by clicking, enters a desktop setting sub-menu by clicking, selects a favorite color in the desktop settings sub-menu, such as red or blue, and then clicks on the OK button to complete the change of the color.

In the process of the change of the color described above, the user needs to click on the menus, select and set the color step by step, the operations are cumbersome and complicated. Particularly, in the case that the user needs to change frequently the color depending on different environments or moods, the complexity of this setting manner is more serious.

Further, when a conventional icon is displayed on the desktop of an electronic device, since a large number of icons occupy the screen, the content of wallpaper may be divided into pieces and displayed incompletely, and in particular, a display effect of portrait wallpaper is even more affected due to be covered by the icons.

Besides, in the conventional art, a plurality of application icons may be displayed by the mobile, such as a SMS icon, a weather forecast application icon and a chat software icon. Parameter information of an application may be displayed on some of the icons. For example, as shown in FIG. 16, the number of an unread message is displayed at a side of the SMS icon.

SUMMARY

In an aspect, an information processing method is provided. The method includes: acquiring an adjustment instruction to S icon objects in a display content of a display unit, where, S is an integer and S≥1, the adjustment instruction comprises parameter information; adjusting the S icon objects in the display content based on the parameter information in response to the adjustment instruction to make the icon object present an adjusted display effect via the display unit.

In another aspect, an electronic device is provided. The electronic device includes a display unit, an acquiring unit and a processing unit, where: the acquiring unit is configured to acquire an adjustment instruction to S icon objects in a display content, where the adjustment instruction includes parameter information; the processing unit is configured to adjust the S icon objects in the display content based on the parameter information in response to the adjustment instruction to make the icon object present an adjusted display effect via the display unit.

With the information processing method and the electronic device according to the embodiment of the present disclosure, a color adjustment instruction including color parameter information may be acquired automatically, color parameter values of L objects in a display content are adjusted based on the color parameter information in response to the color adjustment instruction, thus each of the L objects presents an display effect needed by a user via a display unit. Compared with the existing technology in which the color is set by expanding multi-level menus, the color of the desktop background and the icon objects may be automatically set as the color preferred by the user when the user normally operates the phone. The operation process for setting the color is simplified and convenient the use of the user to the electronic device.

Further, in the embodiments of the present disclosure, when the M icon objects are displayed by the display unit, a display unit is capable of displaying the N icon objects among the M icon objects in the icon regions corresponding to the N icon objects based on first transparency values of the N icon objects of a second type and second transparency values of the N icon objects of a first type, to make the portions of the background image corresponding to the N icon objects of a first type present a second display effect which is different from a first display effect. Transparency values in different parts of the icon object are different. Hence the user may definitely distinguish where an icon object is displayed in the display unit and the normally use of the user to the electronic device is not affected. Moreover, the first transparency value is less than the second transparency value. The background image may be seen since the N icon objects of a first type are almost transparent, that is, the N icon objects of a first type are displayed on the background image approximately transparently. Hence the background image is presented better, and the user may set any image that he/her needs as the background image. Therefore, the hardware advantage of the display screen is emphasized better and the hardware resource is used effectively. In addition, it is as far as possible to avoid that the wallpaper is covered by icon objects, the detail and color of the wallpaper may be presented better, and the display effect of the electronic device is improved.

In embodiments of the disclosure, parameter information is acquired by a first application via a first component, a first icon object is constructed based on the parameter information, a icon object of a first type corresponding to the first application and an icon object of a second type corresponding to the first application. A display mode of at least one of the first icon object of a first type and the first icon object of a second type is determined according to the parameter information. That is, the parameter information is mixed together with the first icon object to be displayed, rather than displayed at a side of the first icon object. Thus no extra display region of the electronic device will be occupied, and thus the technical effect of saving the display region of the electronic device is achieved. In addition, the first icon object is integrated with the parameter information, therefore, the user will not confuse the parameter information.

BRIEF DESCRIPTION OF THE DRAWINGS

To make the technical solutions according to the embodiments of the present disclosure or the existing technology clearer, the drawings to be used in the description of the embodiments or the existing technology will be described briefly as follows. It is apparent that the drawings in the following description are only a few embodiments of the present disclosure. For those skilled in the art, other accompany drawings may be obtained according to these drawings without any creative work.

DETAILED DESCRIPTION OF THE EMBODIMENTS

The technology solution according to the embodiments of the present disclosure will be described clearly and completely below in conjunction with the drawings according to the embodiments of the present disclosure. It is apparent that the embodiments described are only a few of the embodiments according to the present disclosure rather than all of the embodiments. All the other embodiments obtained by those skilled in the art based on the embodiments in the present disclosure without any creative work belong to the scope of protection of the present disclosure.

One embodiment of the disclosure provides an information processing method, which is applicable to an electronic device. The electronic device includes a display unit. The method includes:

acquiring an adjustment instruction to an icon object in a display content, where the adjustment instruction includes parameter information, and a display mode of at least one of the icon object of a first type and the icon object of a second type is determined according to the parameter information, the icon object of a first type is configured to carry the icon object of a second type;

adjusting the icon object in the display content based on the parameter information in response to the adjustment instruction to make the icon object present an adjusted display effect via the display unit.

Figure 1:
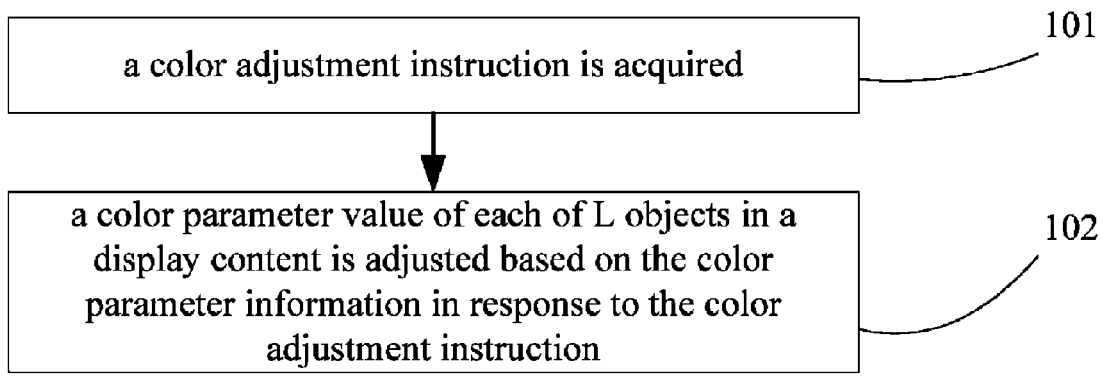
FIG. 1 is a flowchart of an information processing method according to an embodiment of the present disclosure.

To simply the operation process of the desktop color setting, the present disclosure provides an information processing method, which is applicable to an electronic device, such as phones or tablet PC, and so on. The electronic device includes at least a display unit. As shown in FIG. 1, the method includes the following steps 101 to 102.

In step 101, a color adjustment instruction is acquired.

The color adjustment instruction includes at least color parameter information. The color parameter information is configured to provide color parameters to be adjusted, such as a chrominance value, a saturation value or a chroma value, and so on.

In step 102, a color parameter value of each of L objects in a display content is adjusted based on the color parameter information in response to the color adjustment instruction.

The adjustment objects of color according to the embodiment may be elements such as desktop background, icon objects, dialog boxes or text, and so on. The adjustment of color may be performed on only one of the elements by the electronic device, or may be performed on a composition of at least two of the elements, which is not limited in this embodiment. Furthermore, the number of the objects to be adjusted is not limited in this embodiment, and the called L objects may include only one object, such as a desktop background, or may include multiple objects, such as a desktop background and five icon objects, where the L is an integer greater than or equal to 1.

The color parameters of all or a few of the objects are adjusted by the electronic device according to the color parameter information in the color adjustment instruction, the original color parameters of the objects are changed into the color parameters in the color adjustment instruction, so that each of the objects presents an adjusted display effect via the display unit, such as a red color or a blue color, and so on. The color parameter value of each of the L objects for presenting an unadjusted display effect is corresponding to a first value, and the color parameter value of each of the L objects for presenting the adjusted display effect is corresponding to a second value, and the first value of each object is different from the second value thereof. When the color of the objects are adjusted by the electronic device, the color parameters of all the objects may be adjusted into a unified color parameter, or the color parameter of each of the objects may be adjusted exclusively. In the case that the color parameter of each of the objects is adjusted exclusively, both differences and associations exist in the color parameters of the objects. For example, the color of the icon objects are adjusted into a deep red, and the color of the desktop background is adjusted into a light red, so that the adjusted display effects belong to the same color type on the whole. In practice, color parameters of objects of the same type generally are adjusted into the same color parameter, while color parameters of objects of the different types generally are adjusted into different color parameters. For example, colors of all of five icon objects are adjusted into a deep red, and the color of the desktop background is adjusted into a light red different from the color of the five icon objects.

To ensure that both differences and associations exist in the color of the objects of the different types, and the second value of each object should be within a predetermined value range. Taken the saturation as an example, the saturation ranges from 0 to 255. In the case that the overall color belongs to a red color, it is assumed that the saturation value of the icon objects is 47 and the color is true red, the saturation value of the desktop background should range from 47−10 to 47+10 and the color of the desktop background is light red or deep red to distinguish from the color of the icon objects.

The data described above is only for exemplary illustration, and in practice the specific value is not limited by this data.

After the first value of each of the objects is adjusted into the second value, the display effects of the objects are presented via the display unit, thus the change of the color is achieved.

In one application scenario according to this embodiment, the original blue color of the desktop background and the icon objects may be changed by the electronic device into a red color or a yellow color according to a color adjustment instruction. Furthermore, the brightness of each object may be adjusted by the electronic device, so that the display of the color of objects has differences in brightness.

With the information processing method provided according to the embodiment of the present disclosure, the color adjustment instruction including the color parameter information may be acquired automatically, a color parameter value of each of the L objects in the display content is adjusted based on the color parameter information in response to the acquired color adjustment instruction, so that each of the L objects presents an display effect needed by the user via the display unit. Compared with the existing technology in which the color is set via expanding multi-level menus, the color of the desktop background or the icon objects may be set automatically as the color that the user prefers when the user normally operates the phone. The operation process for setting the color is simplified and convenient for the use of the user to the electronic device.

Figure 2:
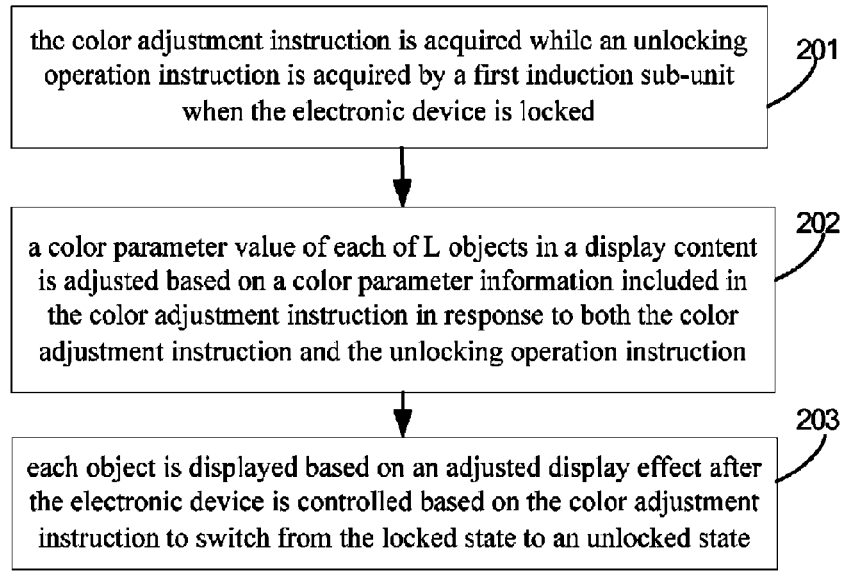
FIG. 2 is a flowchart of another information processing method according to an embodiment of the present disclosure.

As the refinement and extension of the method shown in FIG. 1, the present embodiment further provides an information processing method. With this method, the user may select and change the color while the screen is unlocked. The unlocking operation and the color setting and changing operation may be performed together to facilitate the user. Specifically, as shown in FIG. 2, the method includes the following steps 201 to 203.

In step 201, the color adjustment instruction is acquired while an unlocking operation instruction is acquired by a first induction sub-unit when the electronic device is locked.

In this embodiment, the color adjustment instruction and the unlocking operation instruction are combined into one instruction, and the user triggers the color adjustment instruction while triggering the unlocking operation instruction. The subsequent steps are performed by the electronic device according to the color adjustment instruction.

In step 202, a color parameter value of each of L objects in a display content is adjusted based on a color parameter information included in the color adjustment instruction in response to both the color adjustment instruction and the unlocking operation instruction.

The electronic device is controlled based on the unlocking operation instruction to switch from the locked state to an unlocked state. Meanwhile, the color parameter value of each of the L objects in the display content is adjusted based on the color parameter information in response to the color adjustment instruction, thus the original first value of each of the objects is adjusted into the second value.

As described above, the above L objects in this embodiment may include objects of the same type, such as multiple icon objects; or may include objects of different types, such as a desktop background and multiple icon objects. In one application scenario according to this embodiment, the L objects include one object of a first type and L−1 objects of a second type, the object of a first type is configured to carry the objects of a second type in the case that the object of a first type and the L−1 objects of a second type are displayed by the display unit. For example, a color adjustment are performed on five objects by the electronic device, in which the objects include one desktop background object (which is the object of a first type) configured to carry the icon objects and four icon objects (which are the objects of a second type). In another application scenario according to this embodiment, the L objects include only L the objects of a second type, for example, the color adjustment are performed on five icon objects (which are the second type object).

In step 203, each object is displayed based on an adjusted display effect after the electronic device is controlled based on the color adjustment instruction to switch from the locked state to an unlocked state.

After the first value of each of the objects is adjusted into the second value, the adjusted display effects of the objects are displayed by the electronic device through the display unit.

The implement shown in FIG. 2 is described below in detail by the specific solutions.

Solution A

Figure 3:
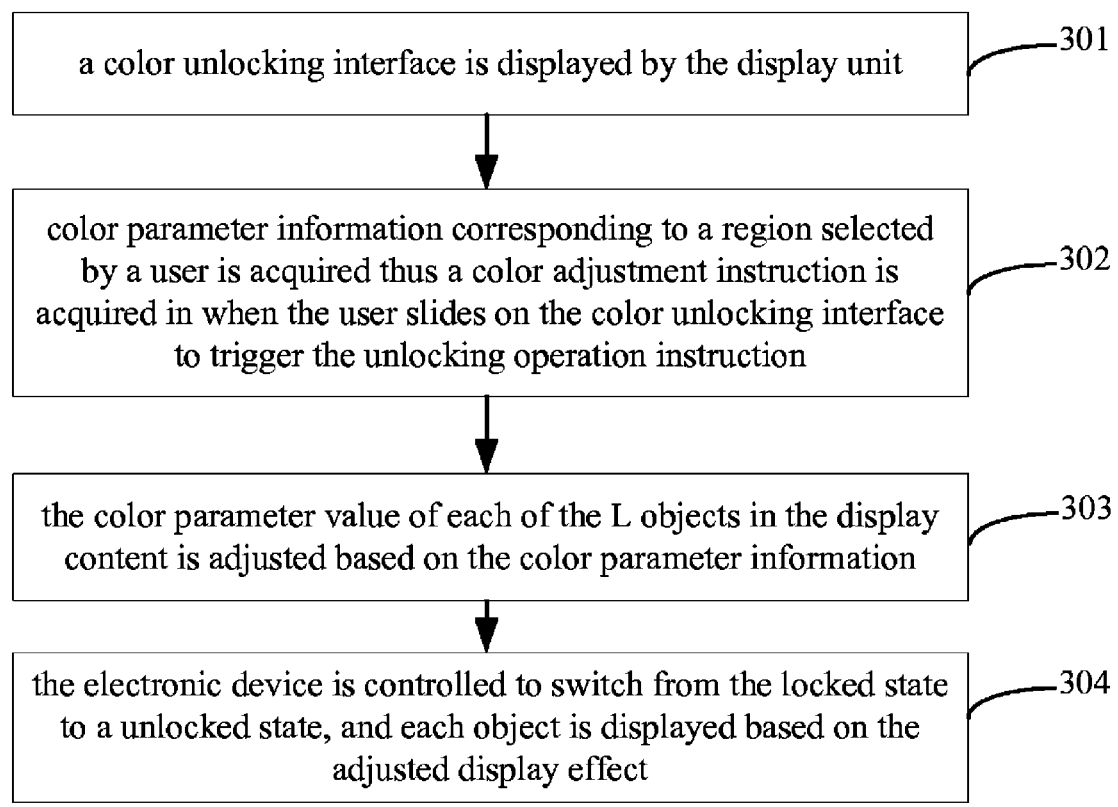
FIG. 3 is a flowchart of another information processing method according to an embodiment of the present disclosure.

In this solution, the user may select the color to be adjusted while the color unlocking interface is unlocked, the color of the objects such as the desktop background and icon objects are adjusted by the electronic device into the color selected by the user while the unlocking operation is performed. Specifically, as shown in FIG. 3, the solution A includes the following steps 301 to 304.

In step 301, a color unlocking interface is displayed by the display unit.

Figure 4:
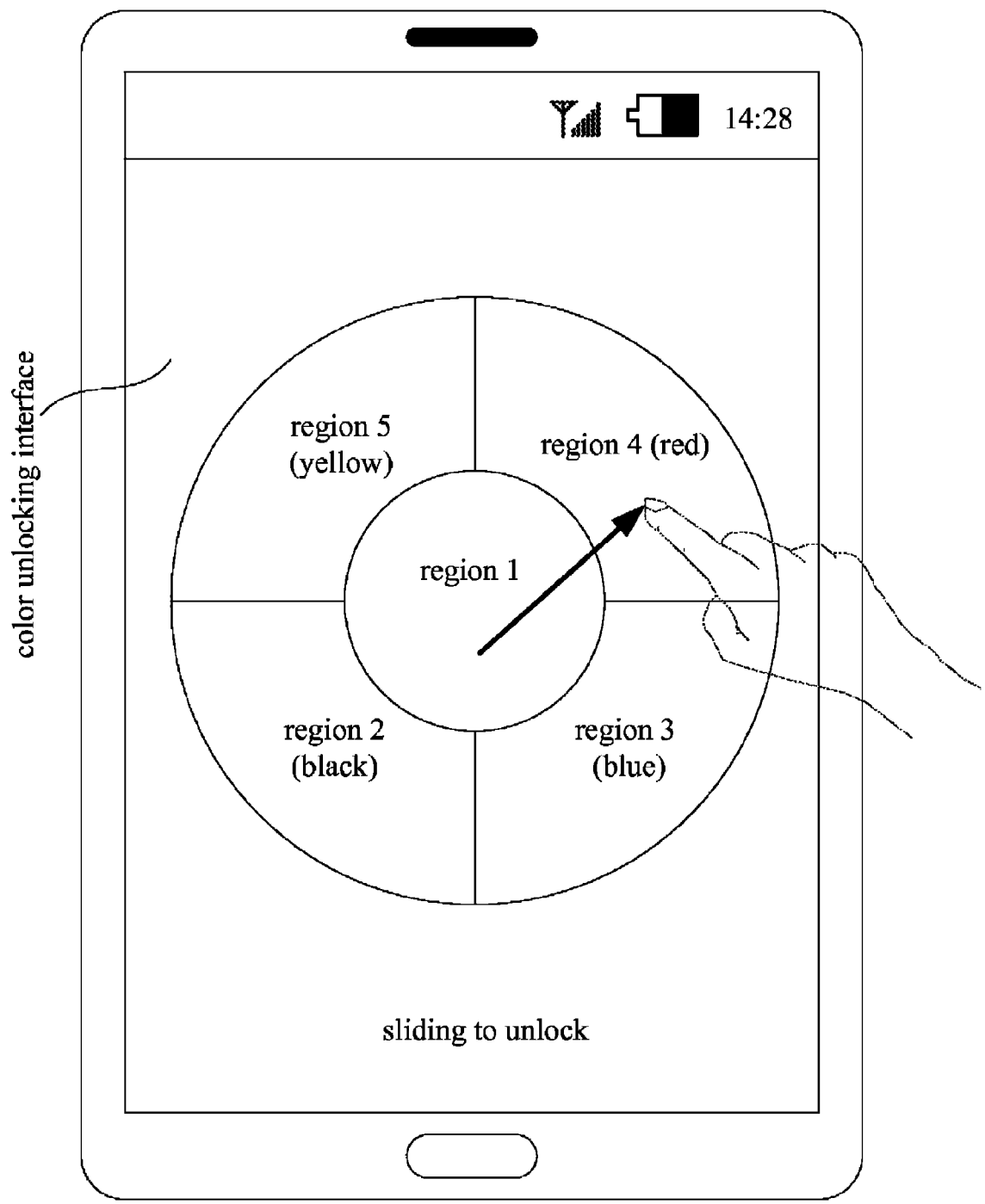
FIG. 4 is a schematic diagram of a color unlocking interface according to an embodiment of the present disclosure.

The user triggers a "power" button in the case that the electronic device is locked, and then the display unit is lighted and displays a color unlocking interface as shown in FIG. 4. The color unlocking interface is both an unlocking interface and a color selection interface. The circular region 1 in a center of the color unlocking interface is a start point of a slide unlocking operation, and the regions 2 to 5 around the region 1 are the endpoint of the slide unlocking operation and also are the color selection regions, where each region is marked or filled with one color, and different colors are displayed in different regions.

In step 302, color parameter information corresponding to a region selected by a user is acquired thus a color adjustment instruction is acquired in when the user slides on the color unlocking interface to trigger the unlocking operation instruction.

In FIG. 4, when the user slides from the region 1 to a certain region of the region 2 to the region 5, the unlocking operation instruction is acquired by the electronic device, meanwhile the color parameter information corresponding to a region selected by the user is acquired thus the color adjustment instruction is acquired.

In step 303, the color parameter value of each of the L objects in the display content is adjusted based on the color parameter information.

For example, in FIG. 4, the user slides from the region 1 to the region 4, the color parameter value of each of the L objects in the display content is adjusted into the color parameter value corresponding to red by the electronic device.

In step 304, the electronic device is controlled to switch from the locked state to a unlocked state, and each object is displayed based on the adjusted display effect.

After being unlocked, the electronic device displays the display effect of each of the objects corresponding to the adjusted color parameter value by the display unit, for example the desktop background presents light red and the icon object presents deep red.

In the solution A provided by the embodiment, the unlocking slide operation and the color selection operation are combined into one operation, so that a favorite color may be selected by the user while the unlocking slide operation is performed, without exclusively entering into the setting menus to perform selecting. The operation steps can be simplified and convenient the use of the user to the electronic device.

Solution B

Figure 5:
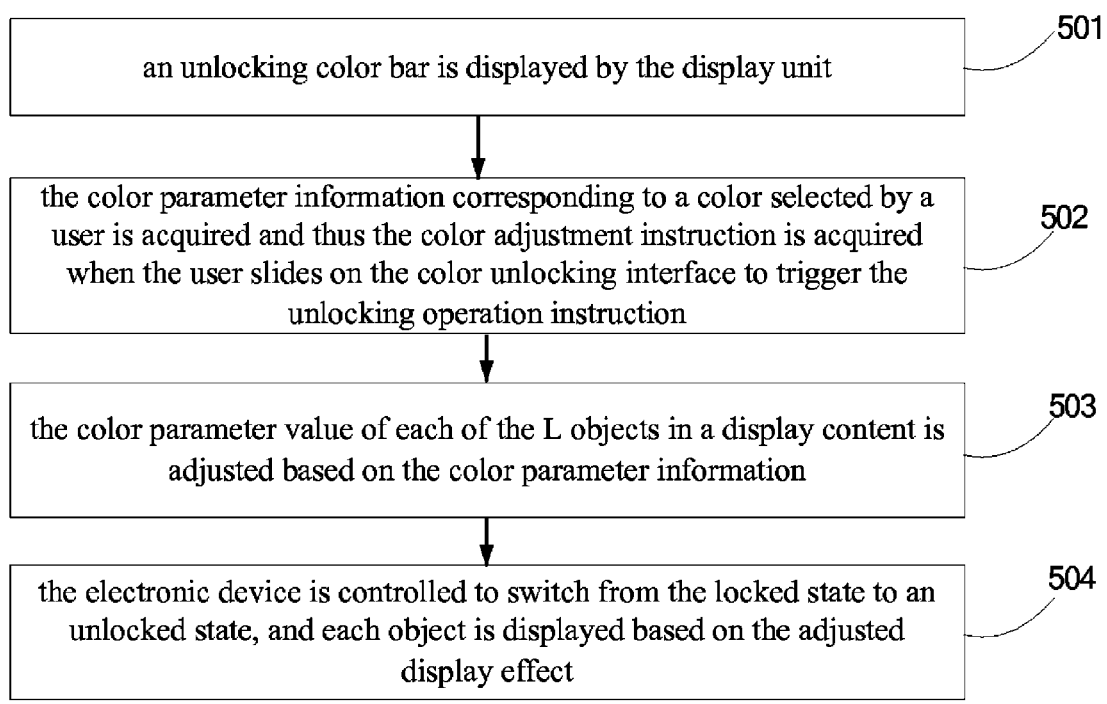
FIG. 5 is a flowchart of another information processing method according to an embodiment of the present disclosure.

In this solution, the unlocking operation is performed by the user via a slide unlocking bar, the user may select the color which to be adjusted into on the slide unlocking bar. The color of the objects such as the desktop background or icon objects, and so on, are adjusted by the electronic device into the color selected by the user while the unlocking operation is performed. Specifically, as shown in FIG. 5, the solution B includes the following steps 501 to 504.

In step 501, an unlocking color bar is displayed by the display unit.

Figure 6:
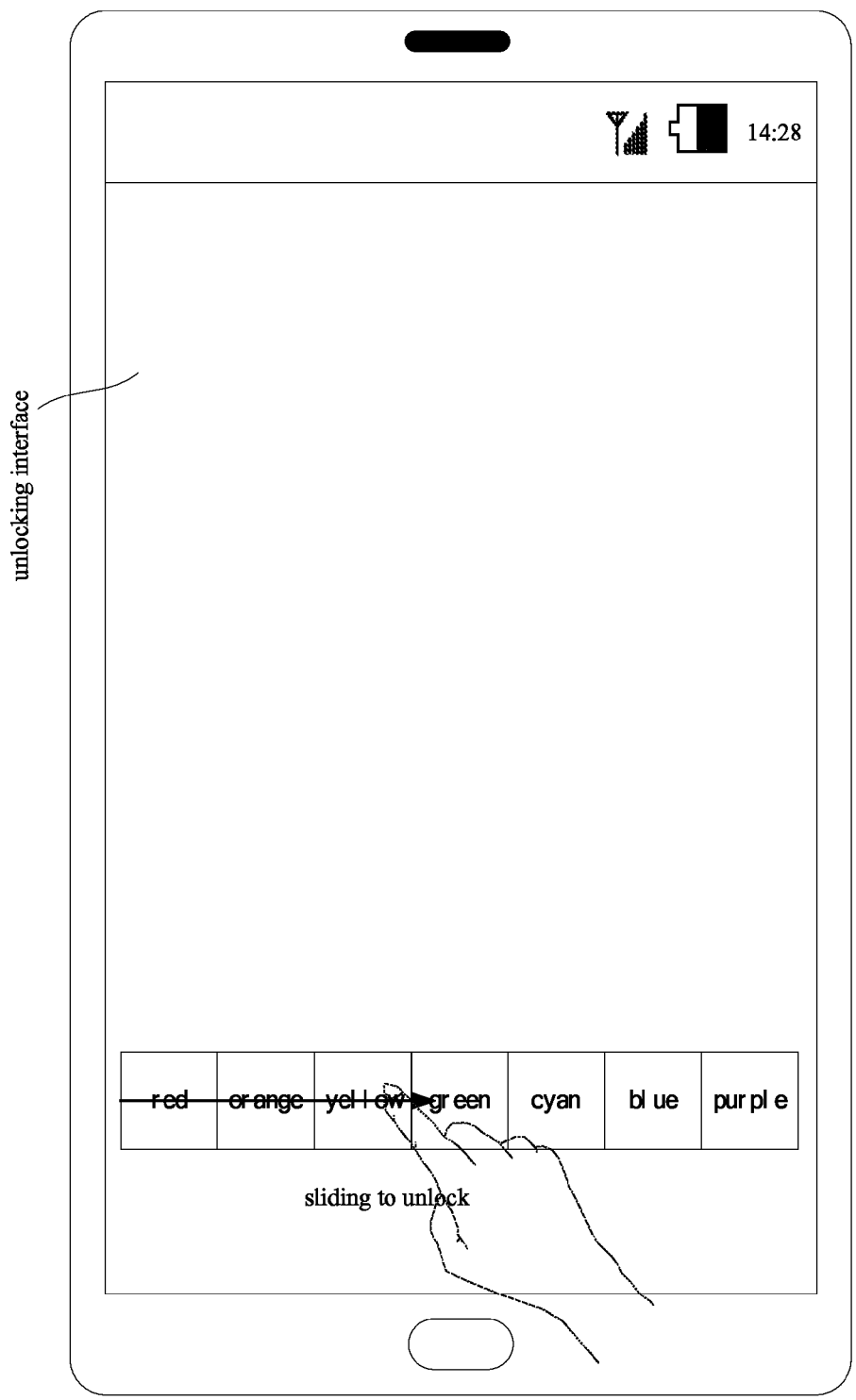
FIG. 6 is a schematic diagram of an unlocking interface according to an embodiment of the present disclosure.

The user triggers the "power" button in the case that the electronic device is locked, and then the display unit is lighted and displays the unlocking interface as shown in FIG. 6, which is different from the existing technology that the unlocking slide bar displayed by the display unit in FIG. 6 includes a variety colors for the user to select.

In this embodiment, the selectable colors in the unlocking color bar may be arranged in sequence discretely to be displayed in the unlocking color bar. For example, seven colors are arranged from the left to right in the order of red, orange, yellow, green, cyan, blue and purple as shown in FIG. 6. Furthermore, the regions of the unlocking bar between the different selectable colors may be filled continuously with soft colors, the chrominance between the different colors transfers smoothly, thus forming a transitional color. The display manner of the unlocking color bar is not limited by the embodiment.

In step 502, the color parameter information corresponding to a color selected by a user is acquired and thus the color adjustment instruction is acquired when the user slides on the color unlocking interface to trigger the unlocking operation instruction.

In FIG. 6, for example, when the user slides from the left of the unlocking color bar and stops at the position of green color, the unlocking operation instruction is acquired by the electronic device, and meanwhile the color parameter information corresponding to the green color is acquired by the electronic device and thus the color adjustment instruction is acquired.

In step 503, the color parameter value of each of the L objects in a display content is adjusted based on the color parameter information.

For example, the user stops sliding at the position of green color, the color parameter value of each of the L objects in the display content is adjusted into the color parameter value corresponding to the green color.

In step 504, the electronic device is controlled to switch from the locked state to an unlocked state, and each object is displayed based on the adjusted display effect.

After being unlocked, the electronic device displays the display effect of each of the objects corresponding to the adjusted color parameter value by the display unit, for example the desktop background presents light green and the icon object presents deep green.

In the solution B provided by the embodiment, the color selection interface may be integrated with the unlocking slide bar, and the unlocking slide operation and the color selection operation are combined into one operation, so that a favorite color may be selected by the user while the unlocking slide operation is performed, without exclusively entering into the setting menus to perform selecting. The operation steps can be simplified and convenient for the use of the user to the electronic device.

Solution C

Figure 7:
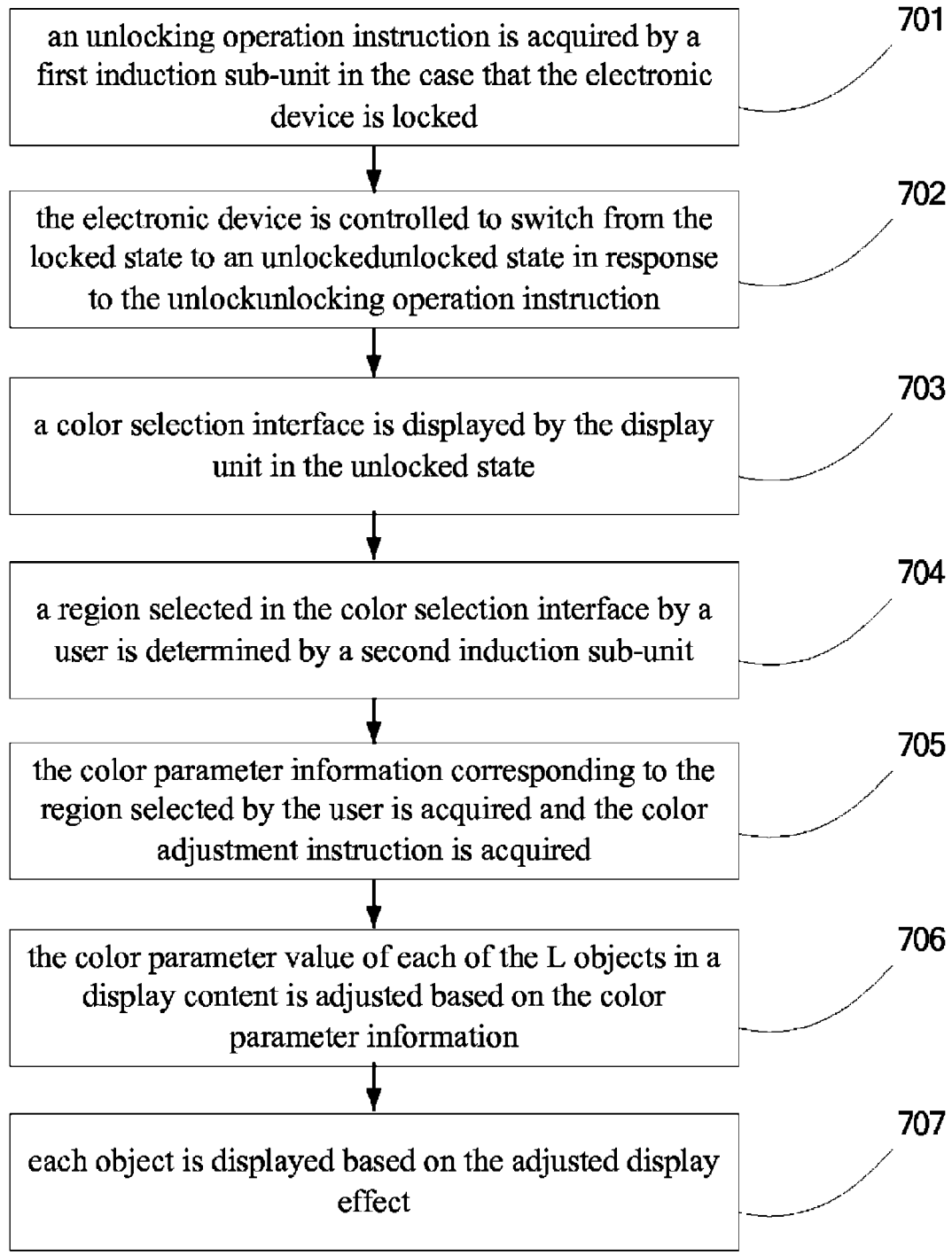
FIG. 7 is a flowchart of a information processing method according to an embodiment of the present disclosure.

In this solution, the unlocking operation is performed on the electronic device by the user. After electronic device is unlocked, the color selection interface is displayed by the electronic device through the display unit for the user to select the favorite color. After the selection operation is completed by the user, the color of the objects such as the desktop background and icon objects, and so on, are adjusted, by the electronic device, into the color selected by user. Specifically, as shown in FIG. 7, the solution C includes the following steps 701 to 704.

In step 701, an unlocking operation instruction is acquired by a first induction sub-unit in the case that the electronic device is locked.

The unlocking operation may be performed in a manner of sliding or inputting the password, which is not limited by this embodiment.

In step 702, the electronic device is controlled to switch from the locked state to an unlocked state in response to the unlocking operation instruction.

In step 703, a color selection interface is displayed by the display unit in the unlocked state.

Figure 8:
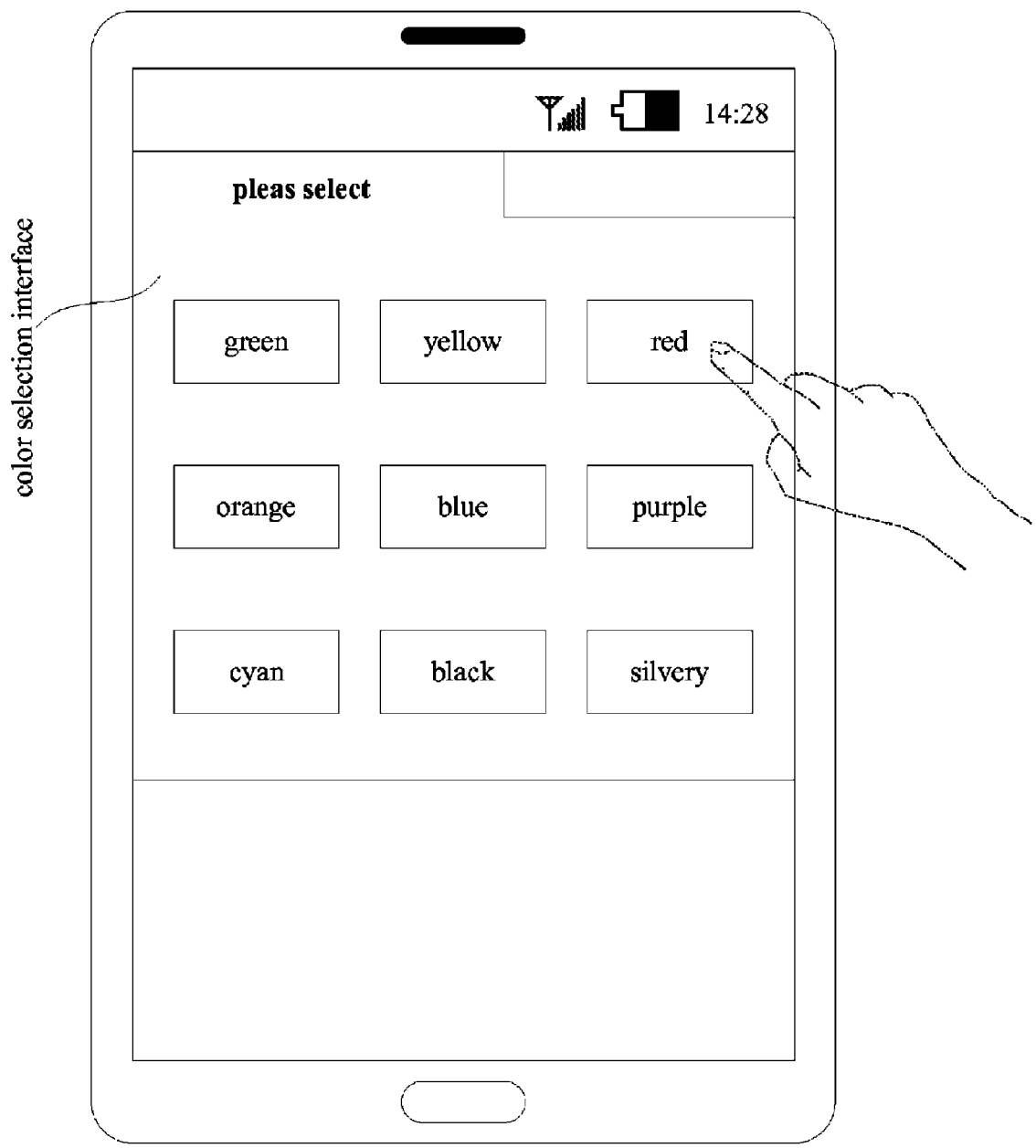
FIG. 8 is a schematic diagram of a color selection interface according to an embodiment of the present disclosure.

The color selection interface displays different colors in different regions to provide the user with the selectable color. For example, the color selection interface may be shown in FIG. 8. In FIG. 8, the color selection interface may be composed of multiple rectangular regions, and each of the regions is marked or filled with one color for the user to select.

In step 704, a region selected in the color selection interface by a user is determined by a second induction sub-unit.

After the user clicks on a certain region, the region selected in the color selection interface by the user is determined by the electronic device through the second induction sub-unit.

In step 705, the color parameter information corresponding to the region selected by the user is acquired and the color adjustment instruction is acquired.

In step 706, the color parameter value of each of the L objects in a display content is adjusted based on the color parameter information.

For example, in the case that the user clicks on the red region of the FIG. 8, the color parameter information corresponding to the red is acquired by the electronic device and the color adjustment instruction is acquired.

In step 707, each object is displayed based on the adjusted display effect.

After being unlocked, the electronic device displays the display effect of each of the objects corresponding to the adjusted color parameter value by the display unit, for example the desktop background presents light red and the icon object presents deep red.

In the solution C provided by the embodiment, the color selection interface for setting color may be displayed for the user to select a favorite color after the electronic device is unlocked by the user. After the selection operation is completed by the user, the colors of the objects are adjusted and displayed automatically by the electronic device based on the selection results, without exclusively entering into the setting menus to perform selecting. The operation steps can be simplified and convenient for the use of the user to the electronic device.

The above solutions are implements of the color setting performed at the unlocking stage of the electronic device, in addition to this, the present disclosure further provides several solutions for smart setting color to make the color of the desktop background and the icon objects set automatically by the electronic device based on different information, without manually setting by the user. The specific solutions are as follows.

Solution 1

Remaining battery capacity information of a battery is acquired by the electronic device, color parameter information corresponding to the remaining capacity information of a battery is acquired based on a preset first mapping relationship and a color adjustment instruction is acquired. And then the display effect of the color of the objects such as the desktop and icon objects, and so on, are adjusted based on the acquired color adjustment instruction. The first mapping relationship is configured to reflect the corresponding relationship between the remaining capacity of a battery and colors, and different remaining capacities of a battery are corresponding to different colors. For example, in the case that the remaining capacity of a battery is greater than 80 per cent, the corresponding color is green; and in the case that the remaining capacity of a battery is less than 10 per cent, the corresponding color is red. Different remaining capacities of a battery are represented by different colors, thus the user may learn more intuitively and timely the remaining battery capacity information, particularly in the case that the remaining capacity of a battery is not enough, such as less than 10 per cent, the intense red color may play a warning role to the user and remind the user to charge the electronic device timely.

Solution 2

In this solution, current weather information is acquired from the network side by the background of the electronic device which is connected to the network, color parameter information corresponding to the current weather information is acquired based on a preset second mapping relationship and a color adjustment instruction is acquired. And then the display effect of the color of the objects such as the desktop and icon objects, and so on, are adjusted based on the acquired color adjustment instruction. The second mapping relationship is configured to reflect the corresponding relationship between the weather conditions and colors, and different weather conditions are corresponding to different colors. For example, in the case that the weather condition is sunny, the corresponding color is green; in the case that the weather condition is cloudy, the corresponding color is gray; and in the case that the weather condition is snowy, the corresponding color is white. Different weather conditions are represented by different colors, thus the sensory experience of the user using the electronic device is consistent with the current weather, and the user may learn the current weather more intuitively.

Solution 3

Current time information is acquired, color parameter information corresponding to the current time information is acquired based on a preset third mapping relationship and a color adjustment instruction is acquired. And then the display effect of the color of the objects such as the desktop and icon objects, and so on, are adjusted based on the acquired color adjustment instruction. The third mapping relationship is configured to reflect the corresponding relationship between the current time and the color, and different times are corresponding to different colors. For example, in the case that the current time is in the early morning, the corresponding color is blue; in the case that the current time is in the noon, the corresponding color is yellow; and in the case that the current time is in the evening, the corresponding color is black. Different time periods during one day are corresponding to different colors, the display effects the color of the objects such as the desktop and icon objects, and so on, during different time periods are set automatically, thus the use experience of the user may be enhanced and the perception of user on time may be improved.

Solution 4

Information of background running thread is acquired, color parameter information corresponding to the information of background running thread is acquired based on a preset fourth mapping relationship and a color adjustment instruction is acquired. And then the display effect of the color of the objects such as the desktop and icon objects, and so on, are adjusted based on the acquired color adjustment instruction. The fourth mapping relationship is configured to reflect the corresponding relationship between the number of the background running threads and the color, and different numbers of the background running threads are corresponding to different colors. For example, in the case that the number of the background running threads is a few, the color of the objects may be set as the soothing colors, such as green, or cyan, etc; in the case that the number of the background running threads is many, the color of the objects may be set as the neutral colors, such as yellow or orange, etc; and in the case that the number of the background running threads is too many leading a load of a processing resource being large, the color of the objects may be set as the intense red. The numbers of the background running threads are corresponding to different colors, thus the user may learn the system load more intuitively to facilitate the user cleaning the resource such as a cache timely.

Solution 5

Information of unprocessed objects is acquired, color parameter information corresponding to the information of unprocessed objects is acquired based on a preset fifth mapping relationship and a color adjustment instruction is acquired. And then the display effect of the color of the objects such as the desktop and icon objects, and so on, are adjusted based on the acquired color adjustment instruction. The fifth mapping relationship is configured to reflect the corresponding relationship between the number of the unprocessed objects and the color, and different numbers of the unprocessed objects are corresponding to different colors. The unprocessed objects according to this embodiment include but not limited to the missed calls, unread SMS message/E-mail, and reminding events. In the case that the number of the unprocessed objects is a few, the color of the objects such as desktop background and icon objects, and so on, may be set as the soothing colors, such as green or cyan, etc; in the case that the number of the unprocessed objects is many, the color of the objects such as desktop background and icon objects may be set as the neutral colors, such as yellow or orange, etc; and in the case that the number of the unprocessed objects is too many, thus influencing the user on acquiring the information timely, the color of the objects such as desktop background and icon objects, and so on, may be set as the intense red. The number of the unprocessed objects is corresponding to different colors, thus the user may view the state of the unprocessed information more intuitively to facilitate the user viewing and processing the unprocessed information timely.

Preferably, in one implement of the solution, there are only two situations of "existing unprocessed information" and "no unprocessed information". In the case that unprocessed information exists, the color of the objects such as the desktop background and icon objects, and so on, are set as a certain preset color in the case that no unprocessed information exists, the objects such as the desktop background and icon object objects, and so on, are not needed to be set.

Furthermore, to achieve the method shown in the above figures, the present disclosure provides an electronic device which is not limited to phones, tablet PC and the like. One embodiment of the disclosure provides an electronic device. The electronic device includes a display unit, an acquiring unit and a processing unit.

The acquiring unit is configured to acquire an adjustment instruction to a icon object in a display content, where the adjustment instruction includes parameter information, and a display mode of at least one of the icon object of a first type and the icon object of a second type is determined according to the parameter information, the icon object of a first type is configured to carry the icon object of a second type;

The processing unit is configured to adjust the icon object in the display content based on the parameter information in response to the adjustment instruction to make the icon object present an adjusted display effect via the display unit.

Figure 9:
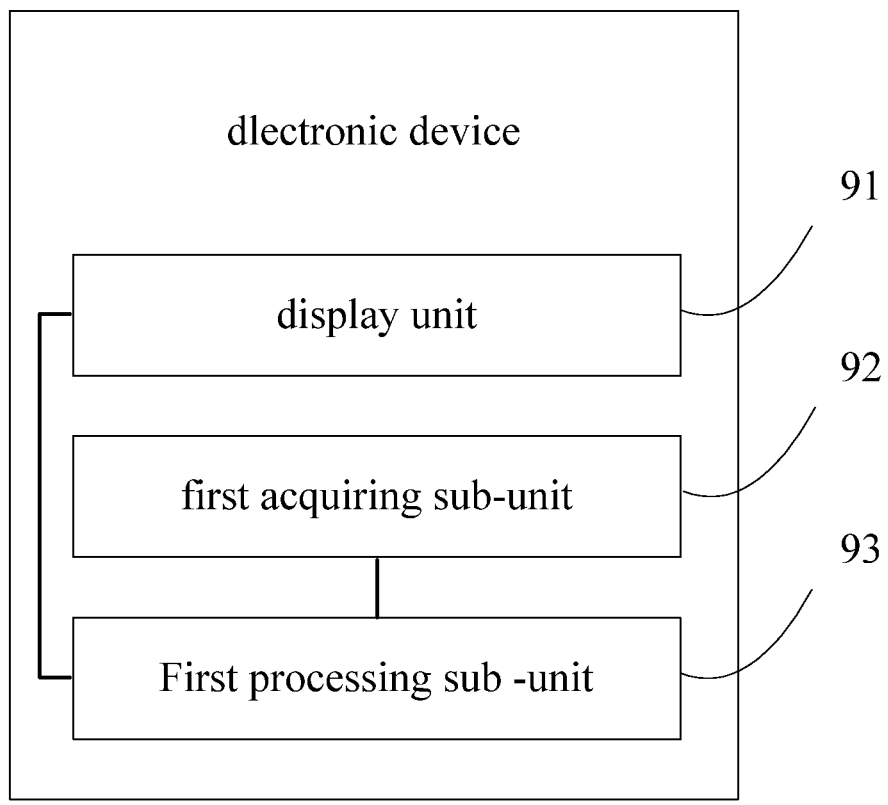
FIG. 9 is a schematic structural diagram of an electronic device according to an embodiment of the present disclosure.

As shown in FIG. 9, an electronic device is provided in an embodiment of the present disclosure. The electronic device includes a display unit 91, a first acquiring sub-unit 92 and a first processing sub-unit 93.

The first acquiring sub-unit 92 is configured to acquire a color adjustment instruction, wherein the color adjustment instruction includes at least color parameter information.

The first processing sub-unit 93 is configured to adjust a color parameter value of each of L objects in a display content based on the color parameter information in response to the color adjustment instruction acquired by the first acquiring sub-unit 92, so that each of the L objects presents an adjusted display effect by the display unit 91, where the color parameter value of each of the L objects for presenting an unadjusted display effect is corresponding to a first value, the color parameter value of each of the L objects for presenting the adjusted display effect is corresponding to a second value, the first value of each object is different from the second value thereof, and the second value of each object is within a predetermined value range, where L is an integer greater than or equal to 1.

Furthermore, the L objects displayed by the display unit 91 include one object of a first type and L−1 objects of a second type, and the object of a first type is configured to carry the second type object in the case that the object of a first type and the L−1 objects of a second type are displayed by the display unit 91; or the L objects displayed by the display unit 91 include only L objects of a second type.

Figure 10:
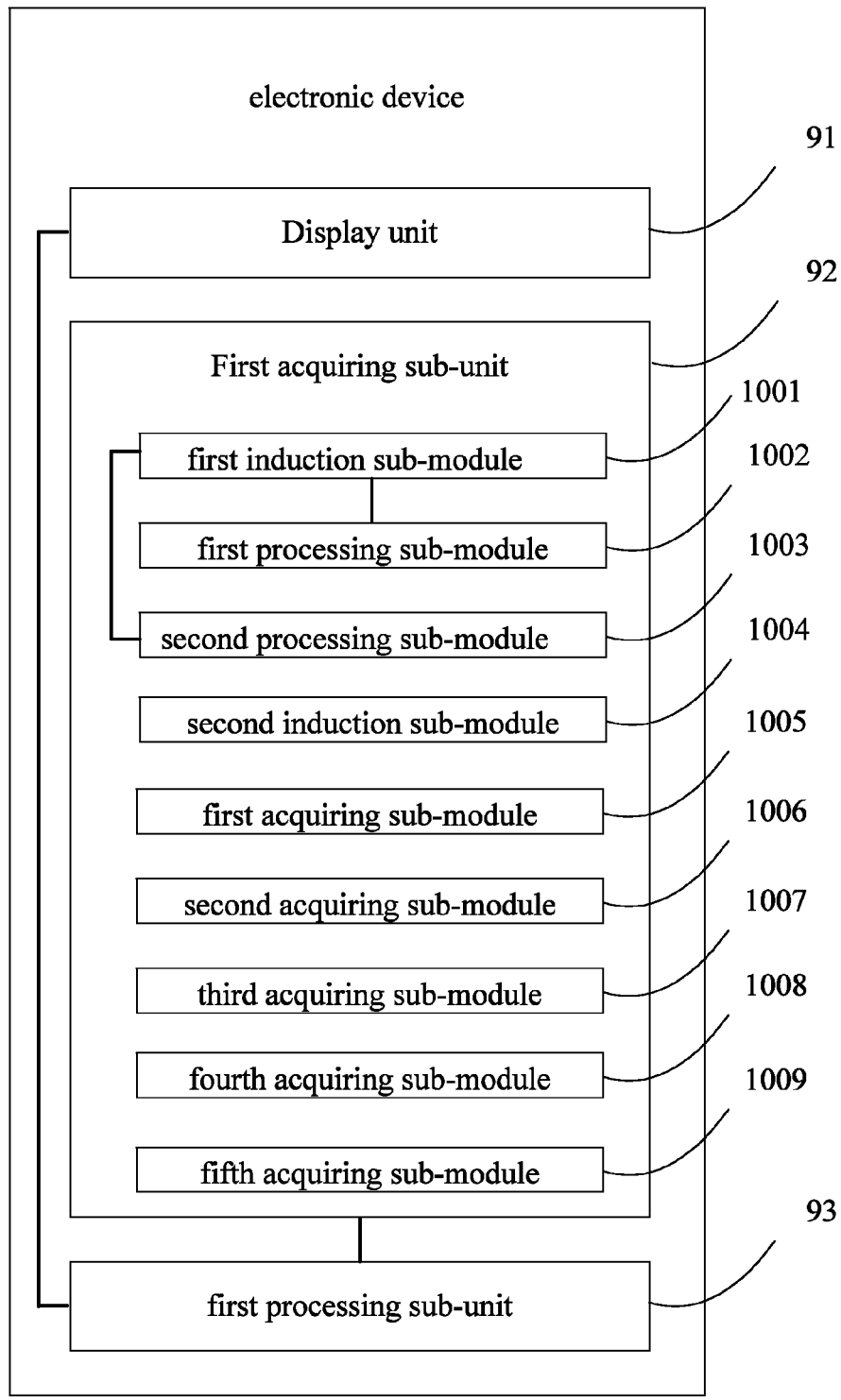
FIG. 10 is a schematic structural diagram of another electronic device according to an embodiment of the present disclosure.

Furthermore, as shown in FIG. 10, the first acquiring sub-unit 92 includes a first induction sub-module 101 and a first processing sub-module 102.

The first induction sub-module 1001 is configured to acquire the color adjustment instruction while an unlocking operation instruction is acquired when the electronic device is locked.

The first processing sub-module 1002 is configured to adjust the color parameter value of each of the L objects in the display content based on the color parameter information, in response to both the color adjustment instruction acquired by the first induction sub-module 101 and the unlocking operation instruction.

The display unit 91 is further configured to display each object based on a adjusted display effect, after the electronic device is controlled by the first processing sub-unit 1002 based on the color adjustment instruction to switch from the locked state to an unlocked state.

Furthermore, the first induction sub-module 1001 is configured to display a color unlocking interface by the display unit 91, with the color unlocking interface displaying different colors in different regions; and acquire the color parameter information corresponding to a region selected by a user and acquire the color adjustment instruction in the case that the user slides on the color unlocking interface to trigger the unlocking operation instruction.

Furthermore, the first induction sub-module 1001 is configured to display an unlocking color bar by the display unit 91, where the unlocking color bar includes transition colors; and acquire the color parameter information corresponding to a color selected by a user and acquire the color adjustment instruction in the case that the user slides on the unlocking color bar to trigger the unlocking operation instruction.

Furthermore, as shown in FIG. 10, the first acquiring sub-unit 92 includes a first induction sub-module 1001, a second processing sub-module 1003, and a second induction sub-module 1004.

The first induction sub-module 1001 is configured to acquire an unlocking operation instruction in the case that the electronic device is locked.

The second processing sub-module 1003 is configured to control the electronic device to switch from the locked state to an unlocked state in response to the unlocking operation instruction acquired by the first induction sub-module 1001, and display a color selection interface by the display unit 91 in the unlocked state, with the color selection interface displaying different colors in different regions.

The second induction sub-module 1004 is configured to determine a region selected by a user in the color selection interface displayed by the display unit 91, and acquire color parameter information corresponding to the region selected by the user and acquire color adjustment instruction.

Furthermore, as shown in FIG. 10, the first acquiring sub-unit 92 includes a first acquiring sub-module 1005, a second acquiring sub-module 1006, a third acquiring sub-module 1007, a fourth acquiring sub-module 1008 and a fifth acquiring sub-module 1009.

The first acquiring sub-module 1005 is configured to acquire remaining capacity information of a battery, acquire color parameter information corresponding to the remaining capacity information of a battery based on a preset first mapping relationship and acquire a color adjustment instruction.

The second acquiring sub-module 1006 is configured to acquire current weather information, acquire color parameter information corresponding to the current weather information based on a preset second mapping relationship and acquire a color adjustment instruction.

The third acquiring sub-module 1007 is configured to acquire current time information, acquire color parameter information corresponding to the current time information based on a preset third mapping relationship and acquire a color adjustment instruction.

The fourth acquiring sub-module 1008 is configured to acquire background running thread information, acquire color parameter information corresponding to the background running thread information based on a preset fourth mapping relationship and acquire a color adjustment instruction.

The fifth acquiring sub-module 1009 is configured to acquire unprocessed object information, acquire color parameter information corresponding to the unprocessed object information based on a preset fifth mapping relationship and acquire a color adjustment instruction.

With the electronic device according to the embodiment of the present disclosure, the color adjustment instruction including a color parameter information may be acquired automatically, color parameter values of the L objects in a display content are adjusted based on the color parameter information in response to the color adjustment instruction, so that each of the L objects presents an display effect needed by the user by the display unit. As compared with the existing technology in which the color is set by expanding multi-level menus, the color of the desktop background and the icon objects can be set automatically as the color that the user prefers when the user normally operates the phone. The operation process for setting the color is simplified and convenient the use of the user to the electronic device.

An information processing method is provided in an embodiment of the present disclosure. The method is applicable in an electronic device which includes a processing unit and a display unit with a display region. The method includes: controlling, by the processing unit, to display a background image in the display region of the display unit and present a first display effect; and controlling, by the processing unit, to display M icon objects on the display region of the display unit, with M being an integer, $M \geq 1$ and the M icon objects covering portions of the background image corresponding to the M icon objects; where each of the M icon objects occupying an icon region on the display region, each of the M icon regions is smaller than the display region. The icon object is used for identifying an application installed on the electronic device or a function unit provided in the electronic device. The processing unit controls a first application or a first function unit corresponding to a first icon object to respond when a first operation instruction for the first icon object is obtained. Controlling, by the processing unit, to display the M icon objects on the display region of the display unit includes: for each of the M icon objects, determining, on the display region, an icon region corresponding to the icon object in which the icon objects is to be located; displaying N icon objects among the M icon objects in icon regions corresponding to the N icon objects based on first transparency values of N icon objects of a second type and second transparency values of N icon objects of a first type, to make portions of the background image corresponding to the N icon objects of a first type present a second display effect which is different from the first display effect, where the first transparency value is less than the second transparency value, N being an integer and $1 \leq N \leq M$; and displaying icon objects among the M icon objects but except the N icon objects in icon regions corresponding to the icon objects among the M icon objects but except the N icon objects based on third transparency values of the icon objects among the M icon objects but except the N icon objects.

In the embodiments of the present disclosure, when displaying the M icon objects, the display unit is capable of displaying the N icon objects among the M icon objects in the icon regions corresponding to the N icon objects based on the first transparency values of the N icon objects of a second type and the second transparency values of the N icon objects of a first type, to enable the portions of the background image corresponding to the N icon objects of a first type to present the second display effect differing from the first display effect. Transparency values corresponding to different parts in the icon object are different; hence the user may definitely distinguish where an icon object is displayed in the display unit and the normally use of the user to the electronic device is not affected. Moreover, the first transparency value is less than the second transparency value. The background image can be seen since the icon objects of a first type are almost transparent, that is, the icon objects of a first type are displayed on the background image approximately transparently. Hence the background image is presented better, and the user may set any image that he/her needs as the background image. Therefore, the hardware advantage of the display screen is emphasized better and the hardware resource is used effectively. In addition, it is as far as possible to avoid that the wallpaper is covered by the icon, the detail and color of the wallpaper can be presented better, and the display effect of the electronic device is improved.

In an embodiment of the present disclosure, the electronic device may be different electronic devices such as a personal computer (PC), a tablet computer (PAD), a mobile phone, a smart television, and is not limited in the present disclosure.

Figure 11:
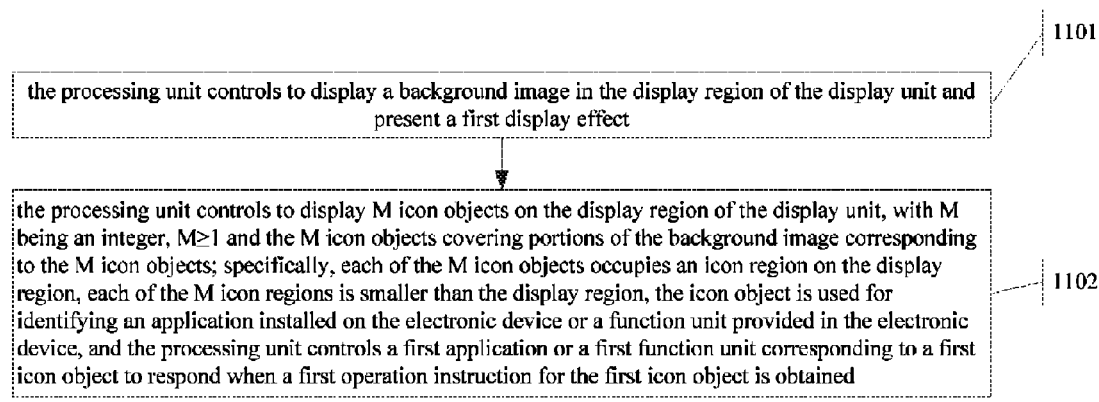
FIG. 11 is a flowchart of a information processing method according to an embodiment of the present disclosure.

Referring to FIG. 11, an embodiment of the present disclosure provides an information processing method, which is applicable in an electronic device which includes a processing unit and a display unit having a display region. The method includes steps 1101 and 1102.

In step 1101, the processing unit controls to display a background image in the display region of the display unit and present a first display effect.

Preferably, the processing unit, for example, may be a Central Processing Unit (CPU) or a Micro Processing Unit (MPU) in the electronic device, or may be a Graphic Processing Unit (GPU) in the electronic device, and the like, and is not limited in the present disclosure.

The processing unit may control the electronic device to display the background image in the display region of the display unit and control the background image to present the first display effect.

The background may be a background image preset in the electronic device, or may be a background image set by a user according to his/her own preference, and the like.

In step 1102, the processing unit controls to display M icon objects on the display region of the display unit, with M being an integer, M≥1 and the M icon objects covering portions of the background image corresponding to the M icon objects; specifically, each of the M icon objects occupies an icon region on the display region, each of the M icon regions is smaller than the display region, the icon object is used for identifying an application installed on the electronic device or a function unit provided in the electronic device, and the processing unit controls a first application or a first function unit corresponding to a first icon object to respond when a first operation instruction for the first icon object is obtained.

The processing unit is capable of controlling to display the M icon objects in the display region. The user may call a corresponding application or perform a corresponding function by operating a icon object. The user performs an operation such as a touch operation, a click operation or other operations on an icon object, as long as the corresponding icon object can be triggered.

Figure 12:
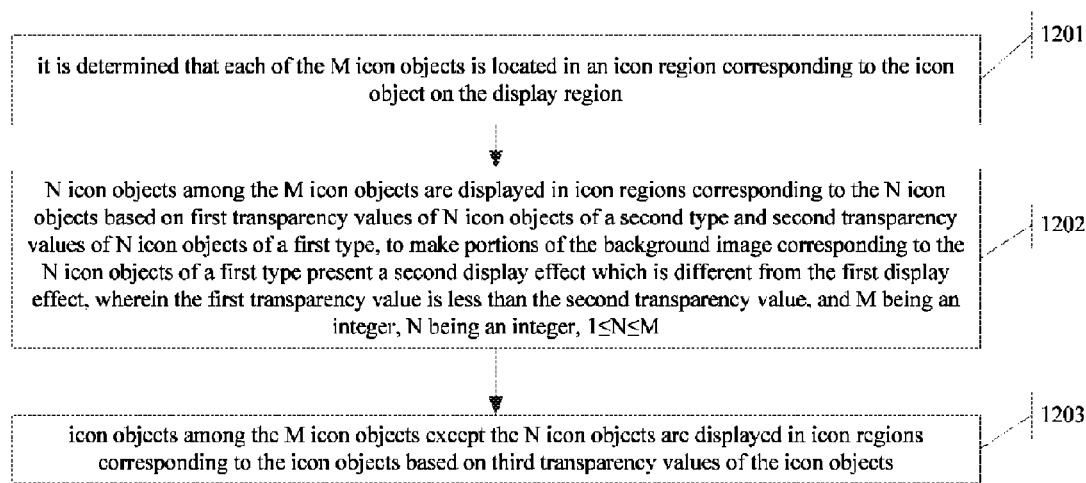
FIG. 12 is a detail flowchart of a second step in a information processing method according to an embodiment of the present disclosure.

Referring to FIG. 12, the processing unit controls to display the M icon objects on the display region of the display unit, which includes step 1201 to step 1203.

In step 1201, it is determined that each of the M icon objects is located in an icon region corresponding to the icon object on the display region.

The processing unit may determine that each of the M icon objects is in the icon region corresponding to the icon object on the display region, that is, determine which region within the display region each icon object is displayed.

In steps 1202, N icon objects among the M icon objects are displayed in icon regions corresponding to the N icon objects based on first transparency values of N icon objects of a second type and second transparency values of N icon objects of a first type, to make portions of the background image corresponding to the N icon objects of a first type present a second display effect which is different from the first display effect, wherein the first transparency value is less than the second transparency value, and M being an integer, N being an integer, 1≤N≤M.

Preferably, in the embodiment of the present disclosure, the N icon objects of a second type are identification portions. That is, each icon object of a second type is the identification portion for identifying a corresponding application or function module, and an icon object can not be referred to as an icon object and has no function of icon object if there is no identification portion therein. The N icon objects of a first type are carrying portions for carrying the identification portions.

Preferably, in an embodiment of the present disclosure, for an icon object, the identification portion thereof may only include a pattern identification. In this case, the pattern identification may be any pattern or image, or may be a text identification. That is, in the embodiment, the text identification may also be regarded as the pattern identification.

For example, the identification portion of the icon object may have various shapes, such as a gear shape or a ring shape, and so on; also may have various pictures such as an animal image or a landscape, and so on. That is, the identification portion of each icon object may be different from others. And the shape of the carrying portion of an icon object is adapted to the shape of the identification portion of the icon object.

Preferably, in an embodiment of the present disclosure, for an icon object, an identification portion thereof may further be a combination of a pattern identification and a text identification, and a carrying portion thereof may correspondingly include a carrying portion for the text identification and a carrying portion for the pattern identification. A portion of the background image corresponding to the carrying portion for the pattern identification presents a second display effect, and a portion of the background image corresponding to the carrying portion for the text identification presents a third display effect which is the same as or different from the second display effect. For example, in the case that the background image presents the second display effect, the carrying portion for the pattern identification has a transparency value A; in the case that the background image presents the third display effect, the carrying portion for the text identification has a transparency value B. The transparency values A and B may be the same, for example, the transparency values A and B may be both fully transparent. Or the transparency value A may be different from the transparency value B, that is, the transparency of the carrying portion for the pattern identification is different from the transparency of the carrying portion for the text identification.

In the embodiment of the present disclosure, the transparency values of the N icon objects may be adjusted when the electronic device is at factory, or may be adjusted after the N icon objects are displayed in the display region, or may be adjusted before the N icon objects are displayed in the display region, which is not limited in the present disclosure.

Preferably, in the embodiment of the present disclosure, displaying the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect may include: recognizing the N icon objects; determining the N icon objects of a second type and the N icon objects of a first type; determining current transparency values of the N icon objects of a second type to be the first transparency value, and/or current transparency values of the N icon objects of a first type to be a fourth transparency value; adjusting the transparency values of the N icon objects of a first type from the fourth transparency value into the second transparency value, where the fourth transparency value is less than the second transparency value; and displaying the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect.

Firstly, the N icon objects may be recognized firstly not matter whether the N icon objects are displayed in the display region or are not displayed. Then, the first types and the second types of each of the N icon objects are determined. And it may be determined that a current transparency value of each icon object of a second type is the first transparency value and a current transparency value of each icon object of a first type is the fourth transparency value. In this case, the first transparency value may be the same as or different from the fourth transparency value.

Then, the transparency values of the N icon objects of a first type are adjusted from the fourth transparency value into the second transparency value. That is, the transparency values of the N icon objects of a first type are improved, so that the N icon objects of a first type become more transparent, and the background image can be displayed better.

Specifically, for an icon object, if the identification portion thereof is a pattern identification, then the carrying portion thereof is only including a carrying portion for the pattern identification. Before being adjusted, a transparency value of the carrying portion thereof is the fourth transparency value and the transparency value may be adjusted into the second transparency value.

Specifically, for an icon object, if the identification portion thereof is a combination of a pattern identification and a text identification, then the carrying portion thereof also includes a carrying portion for the pattern identification and a carrying portion for the text identification. In this case, the second transparency value may be a generic terms of a first sub transparency value and a second sub transparency value. After being adjusted, a transparency value of the carrying portion for the pattern identification is the first sub transparency value and a transparency value of the carrying portion for the text identification is the second sub transparency value. And the first sub transparency value may be the same as or different from the second sub transparency value. For example, the first sub transparency value and the second sub transparency value may be both 100 percent, that is, the carrying portion for the pattern identification and the carrying portion for the text identification are both fully transparent after being adjusted; or the first sub transparency value may be different from the second sub transparency value, that is, the transparency value of the carrying portion for the pattern identification is different from the transparency value of the carrying portion for the text identification. Similarly, the fourth transparency value may be a generic terms of a third sub transparency value and a fourth sub transparency value. Before being adjusted, the transparency value of the carrying portion for the pattern identification is the third sub transparency value and the transparency value of the carrying portion for the text identification is the fourth sub transparency value. And the third sub transparency value may be the same as or different from the fourth sub transparency value.

If it is required that the first sub transparency value is different from the second sub transparency value, the transparency values of the N icon objects of a first type being adjusted from the fourth transparency values into the second transparency values may be that the transparency values may be adjusted respectively. For example, the transparency value of the carrying portion for the pattern identification is adjusted from the third sub transparency value into the first sub transparency value, and the transparency value of the carrying portion for the text identification is adjusted from the fourth sub transparency value into the second sub transparency value.

After an adjustment, the adjusted N icon objects may be displayed in the display region. In this case, portions of the background image corresponding to the N icon objects of a first type may be seen by a user as clearly as possible. Therefore, the portions of the background image corresponding to the N icon objects of a first type may present the second display effect which is different from the first display effect.

Preferably, the first transparency value is less than the second transparency value, and the N icon objects of a first type may be not complete transparent, that is, the second transparency value may not equal to 100 per cent, hence it is more convenient for the user to distinguish each icon object.

Figure 13:
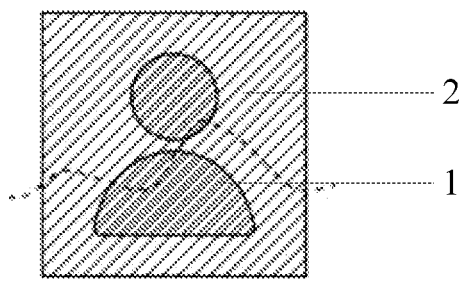
FIG. 13 is a schematic diagram of an icon object, of which an identification portion is a pattern identification, is adjusted according to an embodiment of the present disclosure.

For example, referring to FIG. 13 which is a schematic diagram after an icon object of which an identification portion is a pattern identification is adjusted. The icon object of a second type of is a portrait pattern, as shown by number 1 in FIG. 13. The shape of a the icon object of a first type is adapted to the shape of the icon object of a second type, as shown by number 2 in FIG. 13. In FIG. 13, a density of oblique lines in the icon object of a second type is different from a density of oblique lines in the icon object of a first type, which represents that the transparency value of the icon object of a first type and is different from the transparency value of the icon object of a second type and it is obvious that the icon object of a first type is more transparent. That is to say, after being adjusted, the first transparency value of the identification portion of the icon object is less than the second transparency value of the carrying portion of the icon object. In FIG. 13, the transparency value of the identification portion of the icon object is less than the transparency value of the carrying portion of the icon object. However, the identification portion of the icon object is not completely nontransparent, and some of the background image can be shown through, hence it is convenient for the user to view the background image under the premise that an operation of the user is not affected.

Figure 14:
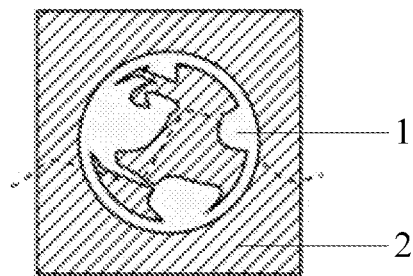
FIG. 14 is another schematic diagram of an icon object, of which an identification portion is a pattern identification, is adjusted according to an embodiment of the present disclosure.

For example, FIG. 14 is a schematic diagram which illustrates that an icon object with an identification portion being a pattern identification is adjusted. The icon object of a second type is an identification pattern, as shown by number 1 in FIG. 14. The shape of the icon object of a first type is adapted to the shape of the icon object of a second type, as shown by number 2 in FIG. 14. In FIG. 4, there is no oblique line in the icon object of a second type and there are oblique lines in the icon object of a first type, which represents that the transparency value of the icon object of a first type is different from the transparency value of the icon object of a second type. The icon object of a first type is obviously more transparent. That is to say, after being adjusted, the first transparency value of the identification portion of the icon object is less than the second transparency value of a carrying portion of the icon object. In FIG. 14, the identification portion of the icon object is completely nontransparent. In this case, the carrying portion of the icon object may be set completely transparent, and the operation of the user may be not affected since the identification portion of the icon object is nontransparent.

Figure 15:
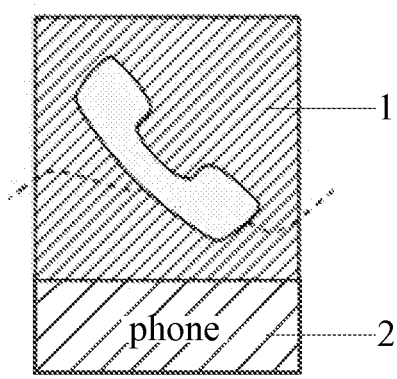
FIG. 15 is a schematic diagram of an icon object, of which an identification portion is a combination of a pattern identification and a text identification, is adjusted according to an embodiment of the present disclosure.

For example, FIG. 15 is a schematic diagram which illustrates that an icon object with an identification portion being a combination of a pattern identification and a text identification is adjusted. The pattern identification is a phone image in FIG. 15, the text identification is "phone" in FIG. 15, a carrying portion for the pattern identification is a portion shown by number 1 in FIG. 15 and a carrying portion for the text identification is a portion shown by number 2 in FIG. 15. In FIG. 15, a density of oblique lines in the carrying portion for the pattern identification of the icon object is different from a density of oblique lines in the carrying portion for the text identification of the icon object, which represents that a transparency value of the carrying portion for the pattern identification of the icon object is different from a transparency value of the carrying portion for the text identification of the icon object, and the carrying portion for the text identification is obviously more transparent.

Preferably, in the embodiment of the present disclosure, the transparency values of the N icon objects may be adjusted at the same time or may be adjusted respectively.

Preferably, in the embodiment of the present disclosure, the electronic device may support an edit mode, under which the N icon objects may be adjusted at the same time or may be adjusted respectively.

Specifically, adjusting the transparency values of the N icon objects of a first type from the fourth transparency value into the second transparency value may includes: under an editing mode, obtaining a first operation; and adjusting the transparency values of the N icon objects of a first type from the fourth transparency value into the second transparency value in response to the first operation; or setting i as an integer from 1 to N, performing the following steps: under the edit mode, obtaining an i-th operation; and adjusting the transparency value of the i-th icon object of a first type among the N icon objects from the fourth transparency value into the second transparency value in response to the i-th operation; where when the i-th icon object is adjusted, the transparency values of the rest icon objects of a first type among the N icon objects are maintained to be the fourth transparency value.

That is, one operation, i.e. the first operation, may be obtained. The N icon objects are adjusted at the same time in response to the one operation. In this way, it is convenient to adjust since the adjustment may be achieved only by one operation, and the adjusting efficiency is high.

Or, one operation may be obtained for each icon object, hence different icon objects are adjusted by different operations. In this way, each icon object may be adjusted respectively and an adjust result is more accurate. Moreover, when one of the icon objects is adjusted, the rest icon objects may not be affected and still maintain original states thereof. In this case, the adjustment of one icon object may not affect other icon objects.

In the embodiment of the present disclosure, the N icon objects may be adjusted by the user or by the electronic device itself.

In the embodiment of the present disclosure, the specific second transparency value may be set by the user or by the electronic device itself.

In step 1203, icon objects among the M icon objects except the N icon objects are displayed in icon regions corresponding to the icon objects based on third transparency values of the icon objects.

Each of the icon objects among the M icon objects except the N icon objects may also include the icon object of a second type and the icon object of a first type, and each icon object not only may be a pattern identification but also may be a combination of a pattern identification and a text identification. However, the icon objects among the M icon objects except the N icon objects may not be adjusted, that is, for the icon objects among the M icon objects except the N icon objects, a transparency value of each icon object of a second type and a transparency value of each icon object of a first type may be the same, for example, each of them may be the third transparency value. Or, even though the icon objects among the M icon objects except the N icon objects are not adjusted, the transparency value of each icon object of a second type and the transparency value of each icon object of a first type may also be different, and the third transparency value is only a generic terms of the transparency values of the two portions.

It may be regarded that, a transparency value adjustment is performed on the N icon objects among the M icon objects but not on the icon objects among the M icon objects except the N icon objects.

An embodiment of the present disclosure provides an electronic device which may have a display unit, acquiring unit and a processing unit. The display unit may have a display region, and the acquiring unit is configured to acquire a first transparency value, a second transparency value and a third transparency value.

The processing unit includes a second processing sub-unit which may be configured to control to display a background image in the display region of the display unit and present a first display effect.

The processing unit further includes a third processing sub-unit which may be configured to control to display M icon objects on the display region of the display unit, with M being an integer, M≥1 and the M icon objects covering portions of the background image corresponding to the M icon objects; where each of the M icon objects occupies an icon region on the display region, each of the M icon regions is smaller than the display region, the icon object is used for identifying an application installed on the electronic device or a function unit provided in the electronic device, and the processing unit controls a first application or a first function unit corresponding to a first icon object to respond when a first operation instruction for the first icon object is obtained.

Specifically, the third process sub-unit may be specifically configured to: for each of the M icon objects, determine, on the display region, an icon region corresponding to the icon object in which the icon objects is to be located; display N icon objects among the M icon objects in icon regions corresponding to the N icon objects based on first transparency values of N icon objects of a second type and second transparency values of N icon objects of a first type, to make portions of the background image corresponding to the N icon objects of a first type present a second display effect which is different from a first display effect, where the first transparency value is less than the second transparency value, and N being a integer, 1≤N≤M; and display icon objects among the M icon objects except the N icon objects in icon regions corresponding to the icon objects among the M icon objects except the N icon objects based on third transparency values of the icon objects among the M icon objects except the N icon objects.

Preferably, in the embodiment of the present disclosure, the N icon objects of a second type are identification portions for identifying corresponding applications or function modules, and the N icon objects of a first type are carrying portions.

Preferably, in the embodiment of the present disclosure, the identification portion is a combination of a pattern identification and a text identification, the carrying portion includes a carrying portion for the pattern identification and a carrying portion for the text identification; a portion of the background image corresponding to the carrying portion for the pattern identification presents the second display effect and a portion of the background image corresponding to the carrying portion for the text identification presents a third display effect which is the same as or different from the second display effect.

Preferably, in the embodiment of the present disclosure, the third processing sub-unit being configured to display the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect may specifically be configured to: recognize the N icon objects; determine the N icon objects of a second type and the N icon objects of a first type; determine current transparency values of the N icon objects of a second type to be the first transparency value, and/or current transparency values of the N icon objects of a first type to be a fourth transparency value; adjust the transparency values of the N icon objects of a first type from the fourth transparency value into the second transparency value, where the fourth transparency value is less than the second transparency value; and display the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect.

Preferably, in the embodiment of the present disclosure, the third processing sub-unit being configured to adjust the transparency values of the N icon objects of a first type from the fourth transparency value into the second transparency value may specifically be configured to: obtain a first operation; and adjust the transparency values of the N icon objects of a first type from the fourth transparency value into the second transparency value in response to the first operation; or take i as an integer from 1 to N and perform the following steps: obtain an i-th operation; and adjust the transparency value of the i-th icon object of a first type among the N icon objects from the fourth transparency value into the second transparency value in response to the i-th operation; where when the i-th icon object is adjusted, the transparency values of the rest icon objects of a first type of among the N icon objects are maintained to be the fourth transparency value.

The information processing method according to the embodiments of the present disclosure is applicable in an electronic device. The electronic device includes a processing unit and a display unit having a display region. The method includes: controlling, by the processing unit, to display a background image in the display region of the display unit and present a first display effect; and controlling, by the processing unit, to display M icon objects on the display region of the display unit, with M being an integer, $M \geq 1$ and the M icon objects covering portions of the background image corresponding to the M icon objects; where each of the M icon objects occupies an icon region on the display region, each of the M icon regions is smaller than the display region, the icon object is used for identifying an application installed on the electronic device or a function unit provided in the electronic device, and the processing unit controls a first application or a first function unit corresponding to a first icon object to respond when a first operation instruction for the first icon object is obtained. Specifically, the controlling, by the processing unit, to display the M icon objects on the display region of the display unit includes: for each of the M icon objects, determining, on the display region, an icon region corresponding to the icon object in which the icon objects is to be located; displaying N icon objects among the M icon objects in icon regions corresponding to the N icon objects based on first transparency values of N icon objects of a second type and second transparency values of N icon objects of a first type, to make portions of the background image corresponding to the N icon objects of a first type present a second display effect which is different from the first display effect, where the first transparency value is less than the second transparency value, and N being an integer, $1 \leq N \leq M$; and displaying icon objects among the M icon objects except the N icon objects in icon regions corresponding to the icon objects among the M icon objects except the N icon objects based on third transparency values of the icon objects among the M icon objects except the N icon objects.

In the embodiments of the present disclosure, when the M icon objects are displayed, the display unit is capable of displaying the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect. Transparency values corresponding to different parts in the icon object are different; hence the user may definitely distinguish where an icon object is displayed in the display unit and the normally use of the user to the electronic device is not affected. Moreover, the first transparency value is less than the second transparency value. The second parts of the N icon objects make the background image seen as clearly as possible, which is that the second parts of the N icon objects are displayed on the background image approximately transparently. Hence the background image is presented better, and the user may set any image that he/her needs as the background image. Therefore, the hardware advantage of the display screen is emphasized better and the hardware resource is used effectively. In addition, it is as far as possible to avoid that the wallpaper is covered by the icon, the detail and color of the wallpaper can be presented better, and the display effect of the electronic device is improved.

It may be clearly understood by those skilled in the art that, the division of the above function modules are only taken as an example, so that the description is convenient and simple. In practical applications, the above functions may be completed by being assigned to different function modules as needed, that is, the internal structure of the device is divided into different function modules to complete all of or parts of the functions described above. In the above system, specific working processes of the device and the unit may refer to corresponding processes according to the embodiments of the aforementioned method, and will not be described herein.

In the several embodiments provided by the present application, it should be understood that, the disclosed system, device and method may be implemented in other modes. For example, the embodiments of device described above are only schematics. For example, the division of the module or unit is only a logic function division, and there may be additional division modes in a practical implementation. For example, multiple units or components may be combined or may be integrated to another system, or some features may be omitted or not performed. On the other hand, the displayed or discussed coupling, direct coupling or communication connection between each other may be an indirect coupling or communication connection passing through some interfaces, devices or units, and may be electrical, mechanical or other forms.

The units described as separate components may be or may be not separated in physical, and the component displayed as a unit may be or may be not a physical unit. That is, the units may be located at the same place or may be distributed on multiple network units. Parts or all of the units may be selected to achieve the object of the embodiment scheme as needed.

In addition, the function units according to the embodiments of the present application may be integrated in one processing unit, or each of the units may exist independently in physical, or two or more units may be integrated in one unit. The above unit integration may be realized by employing hardware or by employing a software function unit.

In the case that the unit is integrated in form of software function unit and is sold or used as an independent product, the unit may be stored in a computer readable storage medium. Based on the above understanding, the technical solution of the present application essentially, or parts of the technical solution contributing to the prior art, or all or parts of the technical solution may be represented in form of software production. The computer software product is stored in a storage medium, including some instructions enabling a computer device (may be a personal computer, a server, a network device, or the like) or a processor to perform all or parts of steps of the method according to the embodiments of the present application. The above storage medium includes various mediums which may store a program code such as a U disk, a removable hard disk, a Read-Only Memory (ROM), a Random Access Memory (RAM), a magnetic disk or an optical disk.

Specifically, computer program instructions corresponding to an information processing method according to the embodiments of the present application may be stored on a storage medium such as an optical disk, a hard disk or a U disk. When the computer program instructions corresponding to an information processing method in the storage medium are read or executed by an electronic device, including the following steps:

controlling, by the processing unit, to display a background image in the display region of the display unit and present a first display effect; and controlling, by the processing unit, to display M icon objects on the display region of the display unit, with M being an integer, M≥1 and the M icon objects occluding portions of the background image corresponding to the M icon objects; where each of the M icon objects occupies an icon region on the display region, each of the M icon regions is smaller than the display region, the icon object is used for identifying an application installed on the electronic device or a function unit provided in the electronic device, and the processing unit controls a first application or a first function unit corresponding to a first icon object to respond when a first operation instruction for the first icon object is obtained;

where controlling, by the processing unit, to display the M icon objects on the display region of the display unit includes:

for each of the M icon objects, determining, on the display region, an icon region corresponding to the icon object in which the icon objects is to be located;

displaying N icon objects among the M icon objects in icon regions corresponding to the N icon objects based on first transparency values of N icon objects of a second type and second transparency values of N icon objects of a first type, to make portions of the background image corresponding to the N icon objects of a first type present a second display effect which is different from the first display effect, where the first transparency value is less than the second transparency value, and N being integer and 1≤N≤M; and displaying icon objects among the M icon objects except the N icon objects in icon regions corresponding to the icon objects among the M icon objects except the N icon objects based on third transparency values of the icon objects among the M icon objects except the N icon objects.

Optionally, the N icon objects of a second type are identification portions for identifying corresponding applications or function modules, and the N icon objects of a first type are carrying portions.

Optionally, the identification portion is a combination of a pattern identification and a text identification, the carrying portion includes a carrying portion for the pattern identification and a carrying portion for the text identification; a portion of the background image corresponding to the carrying portion for the pattern identification presents the second display effect and a portion of the background image corresponding to the carrying portion for the text identification presents a third display effect which is the same as or different from the second display effect.

Optionally, the following steps are stored in the storage medium: displaying the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect, and an execution of the corresponding computer instructions specifically includes:

recognizing the N icon objects;

determining the N icon objects of a second type and the N icon objects of a first type;

determining current transparency values of the N icon objects of a second type to be the first transparency value, and/or current transparency values of the N icon objects of a first type to be a fourth transparency value;

adjusting the transparency values of the N icon objects of a first type from the fourth transparency value into the second transparency value, where the fourth transparency value is less than the second transparency value; and displaying the N icon objects among the M icon objects in the icon regions corresponding to the N icon objects based on the first transparency values of the N icon objects of a second type and the second transparency values of the N icon objects of a first type, to make the portions of the background image corresponding to the N icon objects of a first type present the second display effect which is different from the first display effect.

Optionally, the following steps are stored in the storage medium: adjusting the transparency values of the N icon objects of a first type from the fourth transparency value into the second transparency value, and an execution of the corresponding computer instructions specifically includes:

obtaining a first operation; and adjusting the transparency values of the N icon objects of a first type from the fourth transparency value into the second transparency value in response to the first operation; or setting i as an integer from 1 to N and performing the following steps:

obtaining an i-th operation; and adjusting the transparency value of the i-th icon object of a first type among the N icon objects from the fourth transparency value into the second transparency value in response to the i-th operation; where when the i-th icon object is adjusted, the transparency values of the rest icon objects of a first type among the N icon objects are maintained to be the fourth transparency value.

An information processing method and an electronic device are provided in embodiments of the disclosure for solving the technical problem in the conventional art that the display region for displaying the parameter value at a side of an icon of the electronic device is too big.

An information processing method applicable to an electronic device is provided in an embodiment of the disclosure. The electronic device includes a display unit. The electronic device is installed with J applications, where J is an integer equal to or greater than 1. The electronic device includes K components, where K is an integer equal to or greater than 1. The method includes: acquiring a displaying instruction; acquiring parameter information via a first component by a first application of the J applications in response to the displaying instruction; constructing a first icon object based on the parameter information, a icon object of a first type corresponding to the first application and an icon object of a second type corresponding to the first application, where the first icon object comprises the icon object of a first type and the icon object of a second type, and the icon object of a second type in the first icon object is an identifier for indicating the first application, a display mode of at least one of the first icon object of a first type and the first icon object of a second type is determined according to the parameter information; and displaying the first icon object on the display unit, where the first icon object is configured to display a first interface of the first application on the display unit in response to a triggering operation for the first icon object in the case that the electronic device acquires the triggering operation.

In the above technical solution, parameter information is acquired by a first application via a first component, a first icon object is constructed based on the parameter information, a icon object of a first type corresponding to the first application and an icon object of a second type corresponding to the first application. And a display mode of at least one of the first icon object of a first type and the first icon object of a second type is determined according to the parameter information. That is, the parameter information is integrated with the first icon object to be displayed, rather than displayed at a side of the first icon object. Thus no extra display region of the electronic device will be occupied, and therefore the technical effect of saving the display region of the electronic device is achieved. In addition, the first icon object is integrated with the parameter information, therefore the user will not confuse the parameter information.

An information processing method applicable to an electronic device is provided in an embodiment of the disclosure. The electronic device includes a display unit. The electronic device may be, for example, a mobile, a tablet and a laptop computer. The electronic device is installed with J applications, where J is an integer equal to or greater than 1. The electronic device includes K components, where K is an integer equal to or greater than 1. One of the J applications may be, for example, a SMS application, a weather forecast application, a memory management application or the like. One of the K components may be, for example, a communication component, a temperature sensor, a volatile memory or the like.

Figure 16:
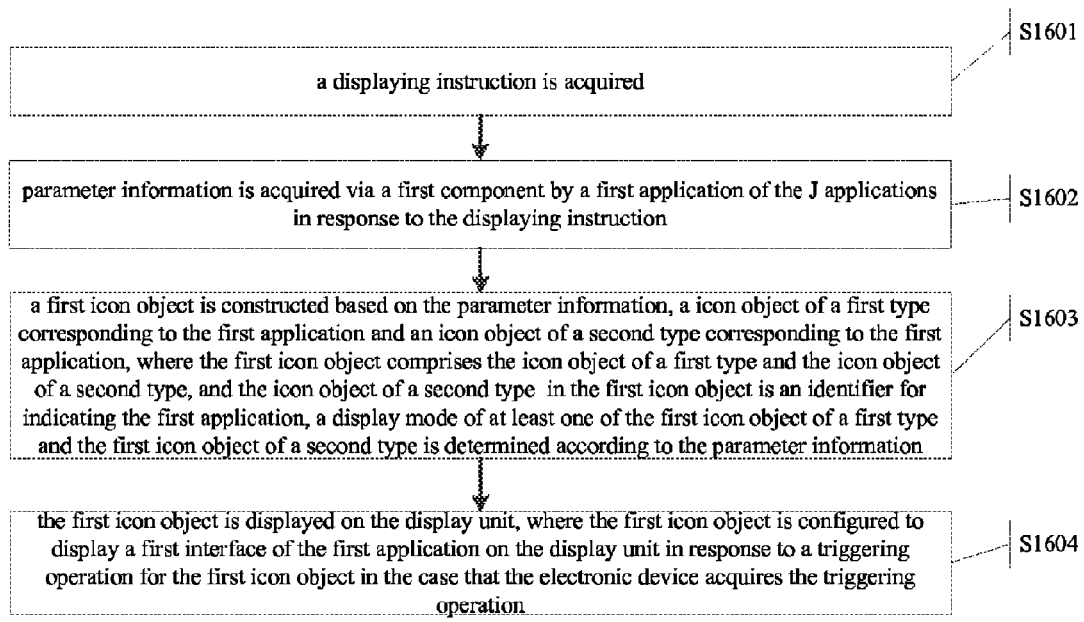
FIG. 16 is a flowchart of an information processing method according to an embodiment of the disclosure.

Referring to FIG. 16, the information processing method includes Steps S1601 to S1604.

In step 1601, a displaying instruction is acquired.

In step 1602, parameter information is acquired via a first component by a first application of the J applications in response to the displaying instruction.

In step 1603, a first icon object is constructed based on the parameter information, a icon object of a first type corresponding to the first application and an icon object of a second type corresponding to the first application, where the first icon object comprises the icon object of a first type and the icon object of a second type, and the icon object of a second type in the first icon object is an identifier for indicating the first application, a display mode of at least one of the first icon object of a first type and the first icon object of a second type is determined according to the parameter information.

In step 1604, the first icon object is displayed on the display unit, where the first icon object is configured to display a first interface of the first application on the display unit in response to a triggering operation for the first icon object in the case that the electronic device acquires the triggering operation.

In a specific implementation process, the J applications may be two kinds of applications, i.e., a first kind of applications and a second kind of applications. Specifically, icon objects of the first kind of applications may be changed with time; and icon objects of the second kind of applications may not be changed with time. The first kind of applications may include, for example, a SMS application, a weather forecast application or the like. The second kind of applications may include, for example, a drawing application, a sound recording application or the like.

In step 1601, the electronic device may acquire the displaying instruction in various ways. In the following, two of these ways will be presented and described. Of course, the ways are not limited to the following two ways in practice.

Acquiring the displaying instruction may include acquiring the displaying instruction on a preset time interval and updating the first icon object in real time by the displaying instruction.

For example, in order to update the parameter information acquired by the first application in real time by updating the first icon object, the electronic device may generate a displaying instruction on a preset time interval automatically. The preset time interval may be, for example, 5 min, 10 min or the like. In response to the displaying instruction, the electronic device may only update the first kind of applications and may also invoke an icon picture corresponding to one of the second kind of applications to construct a second kind of icon objects of the second kind of applications. After the displaying instruction is acquired, it is possible to only update the icon objects of the first kind of applications, and it is also possible to update the icon objects of both the first kind and the second kind of applications, which is not limited in the embodiments of the disclosure.

Figure 17:
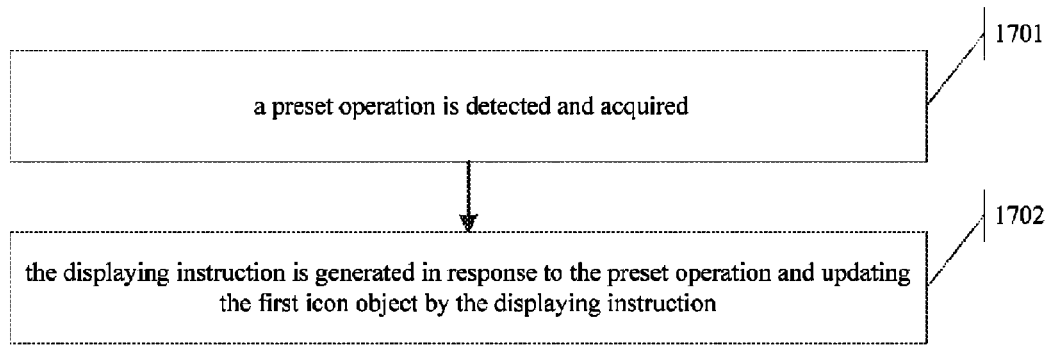
FIG. 17 is a flowchart of acquiring displaying instruction in an information processing method according to an embodiment of the disclosure.

Referring to FIG. 17, acquiring the displaying instruction may include steps 1701 and 1702.

In step 1701, a preset operation is detected and acquired.

In step 1702: the displaying instruction is generated in response to the preset operation and updating the first icon object by the displaying instruction.

In step 1701, the preset operation may be any operation, for example, an operation of keeping pressing the first icon object, generating a preset gesture, opening the electronic device, shaking the electronic device or the like.

In step 1702, to update the first icon object by the displaying instruction, the electronic device may update only the first icon object, update all the first kind of icon objects including the first icon object, or update all the icon objects of the whole electronic device, which is not limited in the embodiments of the disclosure.

In step 1702, there are many ways of updating only the first icon object. For example, it is possible to update a current ambient temperature value in order to update the first icon object if the first icon object corresponds to a weather forecast application; it is possible to display a current memory space occupation ratio and it is also possible to clear the memory first and then display the memory space occupation ratio if the first icon object corresponds to a memory management application in order to update the first icon object.

In step 1602, the ways of acquiring the parameter information are different based on the different first applications or the different first components. In the following, two of these ways will be presented and described. Of course, the ways are not limited to the following two ways in practice.

In the case that the parameter information is ambient temperature information, the ways of acquiring the parameter information are different based on the different first components. In the following, two of these ways will be presented and described. Of course, the ways are not limited to the following two ways in practice.

In the case that the first component is a communication component, acquiring the parameter information via the first component by the first application includes:

acquiring the ambient temperature information from another electronic device via the communication component by the first application.

In a specific implementation process, a cloud server updates the temperature in real time, thus the first application may acquire the ambient temperature information from the cloud server via the communication component. The communication component may be, for example, a Bluetooth module, a wireless module, an infrared module or the like.

In this case, since there is no need to improve a hardware structure of the electronic device, the technical effect of reducing manufacture cost of the electronic device is achieved.

In the case that the first component is a temperature sensor, acquiring the parameter information via the first component by the first application includes:

detecting and acquiring the ambient temperature information via the temperature sensor by the first application.

The temperature sensor may be, for example, a thermocouple temperature sensor, a resistance temperature sensor, an infrared temperature sensor or the like. Since there is no need to acquire ambient temperature information from other electronic devices, the technical effect of saving network traffic is achieved, and even if the electronic device can not be connected to the network, the first icon object may be updated in real time.

In the case that the first component may be a volatile memory, acquiring the parameter information via the first component by the first application may include:

acquiring a memory space occupation ratio of the volatile memory via the volatile memory by the first application.

For example, the volatile memory may be, for example, a memory or a flash memory or the like of the electronic device. The first application may be, for example, a memory management application, and a memory space occupation ratio may be, for example, 50 per cent, 60 per cent or the like, which is not limited in the embodiments of the disclosure.

Optionally, the icon object of a second type may include a first region an area of which is proportional to the memory space occupation ratio.

In a specific implementation process, before generating the first icon object based on Step 1603, the method may further include:

determining the display mode of the icon object of a second type according to the parameter information; and/or determining a color range of the icon object of a first type according to the parameter information.

Figure 18A:
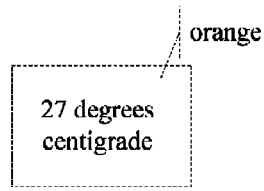
FIG. 18a to FIG. 18c are schematic diagrams of a first icon object in an information processing method according to an embodiment of the disclosure, where the parameter information are different ambient temperature information.
Figure 18B:
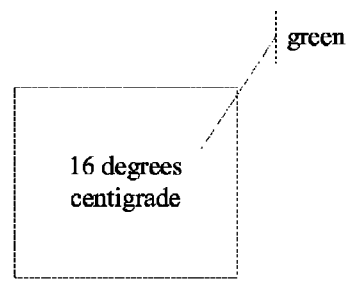
Figure 18C:
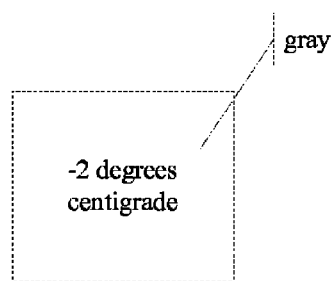

Specifically, the icon object of a second type may include various icon object of a second types such as a picture, a text or the like. In the case that the parameter information is ambient temperature information and the ambient temperature information is 27 degrees centigrade, as shown in FIG. 18a, 27 degrees centigrade is displayed. In the case that the ambient temperature information is 16 degrees centigrade, as shown in FIG. 18b, 16 degrees centigrade is displayed. In the case that the ambient temperature information is −2 degrees centigrade, as shown in FIG. 18c, −2 degrees centigrade is displayed.

Figure 19A:
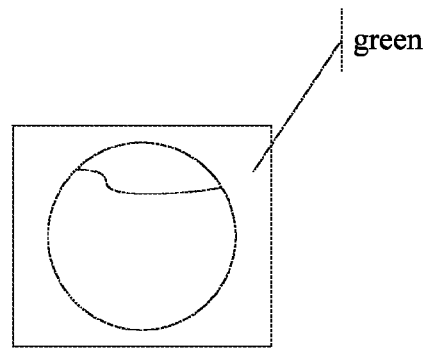
FIG. 19a to FIG. 19c are schematic diagrams of a first icon object in an information processing method according to an embodiment of the disclosure, where the parameter information are different memory space occupation ratio information.
Figure 19B:
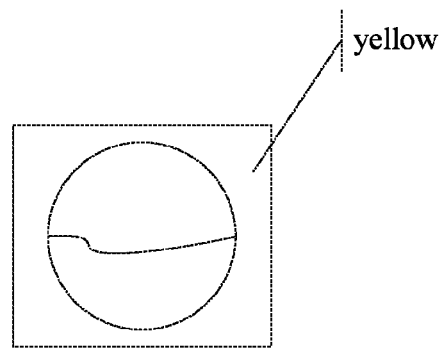
Figure 19C:
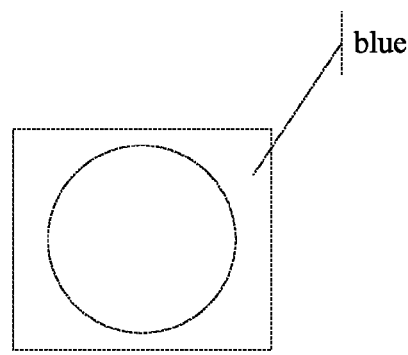

In the case that the parameter information is the memory space occupation ratio and the icon object of a second type is a picture representing water level, the height of the water level may be proportional to the memory space occupation ratio. As shown in FIG. 19a, in the case that the memory space occupation ratio is 80 per cent, the water level is high. As shown in FIG. 19b, in the case that the memory space occupation ratio is 50 per cent, the water level is middle. As shown in FIG. 19c, in the case that the memory space occupation ratio is 0 per cent, there is not a water level.

Specifically, in the case that the parameter information is the ambient temperature information, the icon object of a first type may have different color ranges based on different ambient temperature values. For example, in the case that the ambient temperature information is 27 degrees centigrade, also as shown in FIG. 18a, the color range of the icon object of a first type is orange. In the case that the ambient temperature information is 16 degrees centigrade, also as shown in FIG. 18b, the color range of the icon object of a first type is green. In the case that the ambient temperature information is −2 degrees centigrade, also as shown in FIG. 18c, the color range of the icon object of a first type is grey.

In the case that the parameter information is the memory space occupation ratio, different color ranges may be provided based on different memory space occupation ratios.

For example, also as shown in FIG. 19*a*, in the case that the memory space occupation ratio is 80 per cent, the color of the icon object of a first type is green. In the case that the memory space occupation ratio is 50 per cent, also as shown in FIG. 19*b*, the color of the icon object of a first type is yellow. In the case that the memory space occupation ratio is 0 per cent, also as shown in FIG. 4*c*, the color of the icon object of a first type is blue.

Optionally, in the case that the parameter information is the ambient temperature information, the icon object of a first type may include L regions, the L regions may correspond to L periods in a day respectively, and the i-th region of the L regions may be configured to be filled with a color corresponding to temperature parameter information in the i-th period of the L periods, where i is an integer between 1 and L.

For example, the icon object of a first type is divided into 6 regions which correspond to 0:00~4:00, 4:00~8:00, 8:00~12:00, 12:00~16:00, 16:00~20:00, 20:00~24:00 respectively. And the above time intervals correspond to the average temperature value and color as shown in Table 1 respectively.

TABLE 1

| Time period | Average temperature value | Color |
| --- | --- | --- |
| 0:00~4:00 | 0 degrees centigrade | White |
| 4:00~8:00 | 5 degrees centigrade | Green |
| 8:00~12:00 | 10 degrees centigrade | Orange |
| 12:00~16:00 | 12 degrees centigrade | Red |
| 16:00~20:00 | 9 degrees centigrade | Blue |
| 20:00~24:00 | 3 degrees centigrade | Grey |

Figure 20:
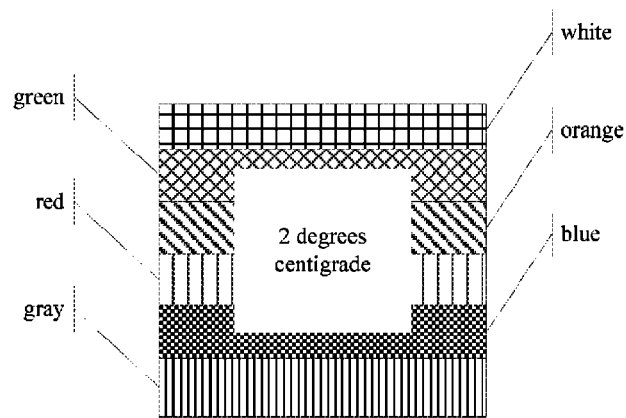
FIG. 20 is a schematic diagrams of a first icon object in an information processing method according to an embodiment of the disclosure in the case that a icon object of a first type is divided into a plurality of regions.

Thus at the end of a day, assuming that the temperature is 2 degrees centigrade at 24:00, the first icon object is displayed as shown in FIG. 20. In a specific implementation process, it is possible to fill the region corresponding to the current time interval with the color corresponding to the current time interval after the last time interval ends. For example, a first region is filled with white color at 4:00; a second region is filled with green color at 8:00; and so on. It is also possible to fill the region corresponding to the current time interval and the regions corresponding to the following time intervals with the color corresponding to the current time interval after the last time interval ends. For example, all the regions are filled with white color at 4:00; the second to the sixth regions are filled with green color at 8:00; the third to the sixth regions are filled with orange color at 12:00; and the like.

In view of the above solution, the technical effect capable of indicating the ambient temperature information on a plurality of time intervals in a day by the color of the icon object of a first type of the first icon object is achieved.

Optionally, in the case that the parameter information is the memory space occupation ratio, the icon object of a second type may include a first region an area of which is proportional to the memory space occupation ratio.

Also referring to FIG. 19*a*, FIG. 19*b* and FIG. 19*c*, the region where the water level exists is the first region. It can be seen that the area of the first region is the largest in the case that the memory space occupation ratio is 80 percent, and the area of the first region is the smallest in the case that the memory space occupation ratio is 0 per cent.

In view of the above solution, the technical effect capable of indicating the memory space occupation ratio by the area of the first region of the icon object of a second type is achieved.

In step 1603, the parameter information acquired by the first application may be represented in various ways in the generated first icon object. In the following, three of these ways will be illustrated. Of course, the ways are not limited to the following three ways in a specific implementation process.

In a first case, the display mode of the first icon object is determined according to the parameter information.

For example, in the determined first icon object, the icon object of a second type may be any icon object of a second type. For example, in the case that the parameter information is the ambient temperature information, the icon object of a second type may be, for example, a cloud, a sun or the like. And the display mode of the icon object of a first type is associated with the ambient temperature information. For example, in the case that the ambient temperature value is 27 degrees centigrade, the color of the icon object of a first type is orange. In the case that the ambient temperature value is 16 degrees centigrade, the color of the icon object of a first type is green. In the case that the ambient temperature value is −2 degrees centigrade, the color of the icon object of a first type is gray.

In the case that the parameter information is the memory space occupation ratio, the icon object of a second type may be, for example, a circle, a semicircle, a rectangle or the like. And the display mode of the icon object of a first type is associated with the memory space occupation ratio.

In a second case, the display mode of the first icon object of a second type is determined according to the parameter information.

For example, in the determined first icon object, the display mode of the icon object of a first type may be any display mode, and the display mode of the icon object of a second type is associated with the parameter information. For example, in the case that the parameter information is the ambient temperature information, the color of the icon object of a first type may be, for example, any color selected from blue, red and white, irrelevant to the ambient temperature information. The icon object of a second type is associated with the ambient temperature value. For example, in the case that the ambient temperature value is 27 degrees centigrade, the icon object of a second type displays 27 degrees centigrade. In the case that the ambient temperature value is 16 degrees centigrade, the icon object of a second type displays 16 degrees centigrade. In the case that the ambient temperature value is −2 degrees centigrade, the icon object of a second type displays −2 degrees centigrade.

In the case that the parameter information is the memory space occupation ratio, the display mode of the icon object of a first type may be any display mode, the icon object of a second type is associated with the memory space occupation ratio.

In a third case, the display mode of the first icon object of a first type is determined according to the parameter information, and the display mode of the first icon object of a second type is determined according to the parameter information.

That is, both the display modes of the first icon object of a first type and the first icon object of a second type are associated with the parameter information. For example, in the case that the parameter information is the ambient temperature information, the first icon object as shown in FIG. 18*a* may be generated in the case that the ambient temperature value is 27 degrees centigrade; the first icon object as shown in FIG. 18*b* may be generated in the case that the ambient temperature value is 16 degrees centigrade;

and the first icon object as shown in FIG. 18c may be generated in the case that the ambient temperature value is −2 degrees centigrade.

In the case that the parameter information is the memory space occupation ratio, the first icon object as shown in FIG. 19a may be generated in the case that the memory space occupation ratio is 80 per cent; the first icon object as shown in FIG. 19b may be generated in the case that the memory space occupation ratio is 50 per cent; and the first icon object as shown in FIG. 19c may be generated in the case that the memory space occupation ratio is 0 per cent.

Since the parameter information may be indicated by the icon object of a first type and the icon object of a second type in the above solution, thus the technical effect that the parameter information is indicated more accurately is achieved.

Figure 21:
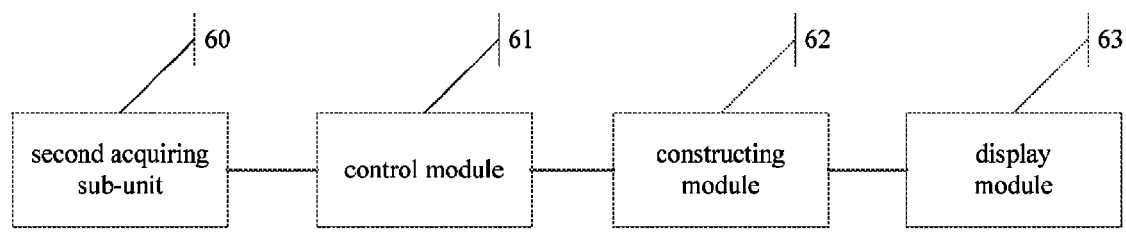
FIG. 21 is a structural diagram of an electronic device provided in an information processing method according to an embodiment of the disclosure.

In another aspect, an electronic device is provided in an embodiment of the disclosure. The electronic device is installed with J applications, where J is an integer equal to or greater than 1. The electronic device includes K components, where K is an integer equal to or greater than 1. The electronic device includes an acquiring unit and a processing unit. Referring to FIG. 21, the acquiring unit includes a second acquiring sub-unit 60, which is configured to acquire a displaying instruction.

The processing unit includes a controlling module 61, constructing module 62 and a displaying module 63.

The controlling module 61 is configured to control a first application of J applications installed in the electronic device to acquire parameter information via a first component of K components in the electronic device in response to the displaying instruction.

The constructing module 62 is configured to construct a first icon object based on the parameter information, a icon object of a first type corresponding to the first application and an icon object of a second type corresponding to the first application, where the first icon object comprises the icon object of a first type and the icon object of a second type, and the icon object of a second type in the first icon object is an identifier for indicating the first application, a display mode of at least one of the first icon object of a first type and the first icon object of a second type is determined according to the parameter information.

The displaying module 63 is configured to display the first icon object on the display unit, where the first icon object is configured to display a first interface of the first application on the display unit in response to a triggering operation in the case that the electronic device acquires the triggering operation for the first icon object.

Optionally, the display mode of the icon object of a first type of the first icon object may be determined according to the parameter information, and the display mode of the icon object of a second type of the first icon object may be determined according to the parameter information.

Optionally, the electronic device may further include a determining module. The determining module may be configured to, before the first icon object is constructed based on the parameter information, a icon object of a first type corresponding to the first application and the icon object of a second type corresponding to the first application, determine the display mode of the icon object of a second type according to the parameter information; and/or determine a color range of the icon object of a first type according to the parameter information.

Optionally, the parameter information may be ambient temperature information. In the case that the first component is a communication component, the controlling module 61 may be configured to control the first application to acquire the ambient temperature information from another electronic device via the communication component. Alternatively, in the case that the first component is a temperature sensor, the controlling module 61 may be configured to control the first application to detect and acquire the ambient temperature information via the temperature sensor.

Optionally, the icon object of a first type may include L regions. The L regions may correspond to L periods in a day respectively, and the i-th region of the L regions may be configured to be filled with a color corresponding to temperature parameter information in the i-th period of the L periods, where i is an integer between 1 and L.

Optionally, the first component may be a volatile memory. The controlling module 61 may be configured to control the first application to acquire a memory space occupation ratio of the volatile memory via the volatile memory.

Optionally, the icon object of a second type may include a first region an area of which is proportional to the memory space occupation ratio.

Optionally, the acquiring module 60 may be configured to acquire the displaying instruction in a preset time interval and updating the first icon object in real time by the displaying instruction.

Optionally, the acquiring module 60 may include a detecting sub-module configured to detect and acquire a preset operation, and a response sub-module configured to generate the displaying instruction in response to the preset operation and updating the first icon object by the displaying instruction.

At least the following technical effects may be provided in one or more embodiments of the disclosure.

In the embodiments of the disclosure, parameter information is acquired by a first application via a first component, a first icon object is constructed based on the parameter information, a icon object of a first type corresponding to the first application and an icon object of a second type corresponding to the first application, and a display mode of at least one of the first icon object of a first type and the first icon object of a second type is determined according to the parameter information. That is, the parameter information is integrated with the first icon object to be displayed, rather than being displayed at a side of the first icon object. Thus no extra display region of the electronic device will be occupied, and therefore the technical effect of saving the display region of the electronic device is achieved. In addition, the first icon object is integrated with the parameter information, therefore the user will not confuse the parameter information.

The ordinary skilled in the art should understand that the embodiments of the disclosure may be provided as methods, systems or computer application products. Therefore, the embodiments of the disclosure may be implemented by the form of all hardware, all software or combination of the hardware and the software. And the embodiments of the disclosure may be implemented by the form of one or more computer application products which are executed in a computer readable storage medium (including a magnetic disk memory, a CD-ROM or a optical memory) installed with computer readable application code.

The disclosure is described with reference to the flowchart and/or the block diagram of the methods, the systems or the computer application products according to the embodiments of the disclosure. It should be understood that each flow in the flowchart and/or each block in the block diagram and the combination of the flows in the flowchart and/or the blocks in the block diagram may be achieved by computer application instructions. These computer application instructions may be installed in a general-purpose computer or a special-purpose computer, an embedded processor or an embedded controller of other programmable data-processing equipment for manufacturing a machine such that a device configured to achieve a function specified by one or more flows in the flowchart and/or one or more blocks in the block diagram may be generated by the instructions which are executed by the computer or the embedded controller of other programmable data-processing equipment.

These computer application instructions may also be stored in the computer readable storage medium which can guide the computer or the embedded controller of other programmable data-processing equipment to work in a particular way, such that the instructions stored in the computer readable storage medium generates a manufacture including an instruction device. The function specified by one or more flows in the flowchart and/or one or more blocks in the block diagram is achieved in the instruction device.

These computer application instructions may also be loaded in the computer or other programmable data-processing equipment, such that a series operation steps are performed in the computer or other programmable data-processing equipments to generate the processing achieved by the computer, and thus the instructions which are executed by the computer or other programmable data-processing equipment provide a step for achieving the function specified by one or more flows in the flowchart and/or one or more blocks in the block diagrams.

Specifically, the computer application instructions corresponding to the information processing method according to the embodiments of the disclosure may be stored in a storage medium such as an optical disk, a hard disk, an USB disk. In the case that the computer application instructions in the storage medium corresponding to the information processing method are acquired and executed by a electronic device, the method includes steps as follows:

acquiring a displaying instruction;

controlling a first application of the J applications installed in the electronic device to acquire parameter information via a first component of K components in response to the displaying instruction, where both J and K are integers equal to or greater than 1;

constructing a first icon object based on the parameter information, a icon object of a first type corresponding to the first application and an icon object of a second type corresponding to the first application, where the first icon object comprises the icon object of a first type and the icon object of a second type, and the icon object of a second type in the first icon object is an identifier for indicating the first application, a display mode of at least one of the first icon object of a first type and the first icon object of a second type is determined according to the parameter information; and displaying the first icon object on the display unit, where the first icon object is configured to display a first interface of the first application on the display unit in response to a triggering operation for the first icon object in the case that the electronic device acquires the triggering operation.

Optionally, the display mode of the icon object of a first type of the first icon object may be determined according to the parameter information, and the display mode of the icon object of a second type of the first icon object may be determined according to the parameter information.

Optionally, other computer instructions are also stored in the storage medium. These computer instructions are executed before the first icon object is constructed based on the parameter information, the icon object of a first type corresponding to the first application and the icon object of a second type corresponding to the first application. The execution progress of the computer instructions includes steps as follows:

determining a display mode of the icon object of a second type according to the parameter information; and/or determining a color range of the icon object of a first type according to the parameter information.

Optionally, the parameter information may be ambient temperature information. In the case that the first component is a communication component, the executing processes of the computer instructions stored in the storage medium corresponding to the step of acquiring the parameter information via the first component by the first application may include a step of acquiring the ambient temperature information from another electronic device via the communication component by the first application. Alternatively, in the case that the first component is a temperature sensor, the executing processes of the computer instructions stored in the storage medium corresponding to the step of acquiring the parameter information via the first component by the first application may include a step of detecting and acquiring the ambient temperature information via the temperature sensor by the first application.

Optionally, the icon object of a first type may include L regions, the L regions may correspond to L periods in a day respectively, and the i-th region of the L regions may be configured to be filled with a color corresponding to temperature parameter information in the i-th period of the L periods, where i is an integer between 1 and L.

Optionally, the first component may be a volatile memory, and the executing processes of the computer instructions stored in the storage medium corresponding to the step of acquiring the parameter information via the first component by the first application may include a step of acquiring a memory space occupation ratio of the volatile memory via the volatile memory by the first application.

Optionally, the icon object of a second type may include a first region an area of which is proportional to the memory space occupation ratio.

Optionally, the executing processes of the computer instructions stored in the storage medium corresponding to the step of acquiring the parameter information via the first component by the first application may include a step of acquiring the displaying instruction on a preset time interval and updating the first icon object in real time by the displaying instruction.

Optionally, the executing processes of the computer instructions stored in the storage medium corresponding to the step of acquiring the parameter information via the first component by the first application may include steps as follows:

detecting and acquiring a preset operation; and generating the displaying instruction in response to the preset operation, and updating the first icon object by the displaying instruction.

Through the description according to the above embodiments, it may be know apparently by those skilled in the art that the present disclosure can be implemented by means of software and the necessary common hardware, or certainly, can be implemented by means of hardware. However, in most situations, the former is the preferable embodiment. In view of the above mentioned, the substance or the part which contributes to the prior art of the technical solution of an embodiment of the disclosure may be embodied in a software product. The computer software product may be stored in a storage medium, such as floppy disk, hard disk or optical disk of the computer, and may include several instructions for causing a desktop computer (may be a personal computer, a server, a network apparatus or the like) to perform the method according to the embodiments of the disclosure.

The above-described are only the specific embodiments of the present disclosure, and the scope of protection of the present disclosure is not limited thereto. Any possible modifications and alternates easy to be thought by those skilled in the art within the technology scope disclosed by the present disclosure will all fall within the scope of protection of the present disclosure. Therefore, the scope of protection of the invention should be defined by the claims.

What is claimed is:

1. An information processing method, applied in an electronic device including a processor, comprising:
   acquiring by the processor, an adjustment instruction to S icon objects in a display content of a display included in the electronic device, wherein, S is an integer and S≥1, the adjustment instruction includes parameter information;
   adjusting, by the processor, the S icon objects in the display content based on the parameter information in response to the adjustment instruction to make the icon object present an adjusted display effect via the display, wherein each icon object is used for identifying an application installed on the electronic device, and wherein the display includes a display region; and
   controlling, by the processor, to display a background image in the display region of the display and present a first display effect;
   wherein acquiring, by the processor, an adjustment instruction to an icon object in a display content comprises:
      acquiring, by the processor, a first transparency value, a second transparency value and a third first transparency value;
   wherein adjusting, by the processor, the S icon objects in the display content based on the parameter information in response to the adjustment instruction comprises:
      adjusting, by the processor, the S icon objects in the display content based on the first transparency value, the second transparency value and the third first transparency value in response to the adjustment instruction,
   wherein adjusting, by the processor, the S icon objects in the display content based on the first transparency value, the second transparency value and the third first transparency value comprises:
      controlling, by the processor, to display M icon objects included in the S icon objects on the display region of the display, with M being an integer and S≥M≥1, and the M icon objects covering portions of the background image corresponding to the M icon objects; wherein each of the M icon objects occupies an icon region on the display region, each of the M icon regions is smaller than the display region, and the processor controls a first application corresponding to a first icon object to make a response when a first operation instruction for the first icon object is obtained;
   wherein controlling, by the processor, to display the M icon objects on the display region of the display comprises:
      for each of the M icon objects, determining, by the processor, on the display region, an icon region corresponding to the icon object in which the icon object is to be located;
      displaying N icon objects among the M icon objects in icon regions corresponding to the N icon objects based on first transparency value of N icon objects of a second type and second transparency value of N icon objects of a first type to make portions of the background image corresponding to the N icon objects of a first type present a second display effect which is different from the first display effect, wherein the first transparency value is less than the second transparency value, and both M and N are integers, 1≤N≤M; and
      displaying icon objects among the M icon objects except the N icon objects in icon regions corresponding to the icon objects among the M icon objects except the N icon objects in icon based on third transparency value of the icon objects among the M icon objects except the N icon objects in icon.

2. The method according to claim 1, wherein:
   the S icon objects comprise L icon objects, L being an integer and S≥L≥1,
   the parameter information comprises color parameter information, and
   adjusting, by the processor, the S icon objects in the display content based on the parameter information in response to the adjustment instruction comprises:
      adjusting, by the processor, the L icon objects in the display content based on the color parameter information in response to the adjustment instruction.

3. The method according to claim 2, wherein adjusting the L icon objects in the display content based on the color parameter information in response to the adjustment instruction comprises:
   wherein adjusting, by the processor, the icon object in the display content based on the parameter information in response to the adjustment instruction to make the icon object present an adjusted display effect via the display comprises:
      adjusting, by the processor, a color parameter value of each of L objects in the display content based on the color parameter information in response to a color adjustment instruction to make each of the L objects present an adjusted display effect by the display, wherein the color parameter value of each of the L objects for presenting an unadjusted display effect is corresponding to a first value, the color parameter value of each of the L objects for presenting the adjusted display effect is corresponding to a second value, the first value of each object is different from the second value of each object, and the second value of each object is within a predetermined value range.

4. The method according to claim 3, wherein acquiring, by the processor, an adjustment instruction comprises:
   acquiring, by the processor, the color adjustment instruction while an unlocking operation instruction is acquired in the case that the electronic device is in a locked state;
   wherein adjusting, by the processor, a color parameter value of each of L objects in a display content based on the color parameter information in response to the color adjustment instruction comprises:
      adjusting, by the processor, the color parameter value of each of the L objects in the display content based on the color parameter information in response to both the color adjustment instruction and the unlocking operation instruction; and
      displaying, by the processor, each object based on the adjusted display effect after the electronic device is controlled based on the color adjustment instruction to switch from the locked state to an unlocked state.

5. The method according to claim 4, wherein acquiring, by the processor, the color adjustment instruction while an unlocking operation instruction is acquired comprises:
displaying a color unlocking interface by the display, wherein the color unlocking interface displays different colors in different regions; and
acquiring, by the processor, the color parameter information corresponding to a region selected by a user and acquiring the color adjustment instruction in the case that the user slides on the color unlocking interface to trigger the unlocking operation instruction.

6. The method according to claim 4, wherein acquiring, by the processor, the color adjustment instruction while an unlocking operation instruction is acquired comprises:
displaying an unlocking color bar by the display, wherein the unlocking color bar includes transition colors; and
acquiring, by the processor, the color parameter information corresponding to a color selected by a user and acquiring the color adjustment instruction in the case that the user slides on the unlocking color bar to trigger the unlocking operation instruction.

7. The method according to claim 1, wherein displaying the N icon objects among the M icon objects in the icon regions corresponding to the N icon objects based on the first transparency value of the N icon objects of a second type and the second transparency value of the N icon objects of a first type to make the portions of the background image corresponding to the N icon objects of a first type present the second display effect which is different from the first display effect comprises:
recognizing, by the processor, the N icon objects;
determining, by the processor, the N icon objects of a second type and the N icon objects of a first type;
determining, by the processor, current transparency value of the N icon objects of a second type to be the first transparency value, and/or current transparency value of the N icon objects of a first type to be a fourth transparency value;
adjusting, by the processor, the transparency value of the N icon objects of a first type from the fourth transparency value into the second transparency value, wherein the fourth transparency value is less than the second transparency value; and
displaying the N icon objects among the M icon objects in the icon regions corresponding to the N icon objects based on the first transparency value of the N icon objects of a second type and the second transparency value of the N icon objects of a first type to make the portions of the background image corresponding to the N icon objects of a first type present the second display effect which is different from the first display effect.

8. The method according to claim 1, wherein the electronic device is installed with J applications, where J is an integer and S≥J≥1; the electronic device includes K components, where K is an integer equal and K≥1; and the method further comprises:
acquiring, by the processor, a displaying instruction;
wherein acquiring, by the processor, an adjustment instruction to S icon objects comprises:
acquiring, by the processor, the adjustment instruction via a first component by a first application of the J applications in response to the displaying instruction;
wherein adjusting, by the processor, the S icon objects in the display content based on the parameter information in response to the adjustment instruction comprises:
adjusting, by the processor, the icon object of the first application in the display content based on the parameter information, an icon object of a first type corresponding to the first application and an icon object of a second type corresponding to the first application.

9. The method according to claim 8, wherein adjusting, by the processor, the icon object of the first application in the display content based on the parameter information, an icon object of a first type corresponding to the first application and an icon object of a second type corresponding to the first application comprises:
constructing, by the processor, a first icon object based on the parameter information, an icon object of a first type corresponding to the first application and an icon object of a second type corresponding to the first application, wherein the icon object of a first type is an carrier, the icon object of a second type is an identifier, and the icon object of a second type of the first icon object is an identifier for indicating the first application; and
displaying the first icon object on the display, wherein the first icon object is configured to display a first interface of the first application on the display in response to a triggering operation for the first icon object in the case that the triggering operation is acquired by the electronic device.

10. The method according to claim 9, wherein, before constructing, by the processor, the first icon object based on the parameter information, the icon object of a first type corresponding to the first application and the icon object of a second type corresponding to the first application, the method further comprises:
determining, by the processor, a display mode of the icon object of a second type according to the parameter information; and/or
determining, by the processor, a color range of the icon object of a first type according to the parameter information.

11. The method according to claim 9, wherein the parameter information is ambient temperature information, wherein
in the case that the first component is a communication component, acquiring, by the processor, the parameter information via the first component by the first application comprises acquiring the ambient temperature information from another electronic device via the communication component by the first application; or
in the case that the first component is a temperature sensor, acquiring, by the processor, the parameter information via the first component by the first application comprises detecting and acquiring the ambient temperature information via the temperature sensor by the first application.

12. The method according to claim 11, wherein the icon object of a first type comprises L regions, the L regions correspond to L periods in a day respectively, and the $i\text{-}_{th}$ region of the L regions is configured to be filled with a color corresponding to temperature parameter information in the $i\text{-}_{th}$ period of the L periods, where i is an integer between 1 and L.

13. The method according to claim 9, wherein the first component is a volatile memory, and acquiring, by the processor, the parameter information via the first component by the first application comprises acquiring, by the processor, a memory space occupation ratio of the volatile memory via the volatile memory by the first application.

14. An electronic device including at least a processor coupled to a memory that stores executable instruction codes, wherein the instruction codes when executed by the processor, configures the electronic device to
acquire an adjustment instruction to S icon objects in a display content, where the adjustment instruction includes parameter information; and
adjust the S icon objects in the display content based on the parameter information in response to the adjustment instruction to make the icon object present an adjusted display effect via a display,
wherein each icon object is used for identifying an application installed on the electronic device, and
wherein the processor further configures the electronic device to:
control to display a background image in a display region of the display and present a first display effect:
acquire a first transparency value, a second transparency value and a third first transparency value; and
adjust the S icon objects in the display content based on the first transparency value, the second transparency value and the third first transparency value in response to the adjustment instruction,
wherein the processor further configures the electronic device to control to display M icon objects included in the S icon objects on a display region of the display, with M being an integer, S≥M≥1, and the M icon objects covering portions of the background image corresponding to the M icon objects;
wherein each of the M icon objects occupies an icon region on the display region, each of the M icon regions is smaller than the display region, and the processor further configures the electronic device controls a first application corresponding to a first icon object to respond when a first operation instruction for the first icon object is obtained: and
wherein the processor further configures the electronic device to:
for each of the M icon objects, determine, on the display region, an icon region corresponding to the icon object in which the icon objects is to be located;
display N icon objects among the M icon objects in icon regions corresponding to the N icon objects based on first transparency value of N icon objects of a second type and second transparency value of N icon objects of a first type to make portions of the background image corresponding to the N icon objects of a first type present a second display effect which is different from the first display effect, wherein the first transparency value is less than the second transparency value, and N being an integer, 1≤N≤M; and
display icon objects among the M icon objects except the N icon objects in icon regions corresponding to the icon objects among the M icon objects except the N icon objects based on third transparency values of the icon objects among the M icon objects except the N icon objects.

15. The electronic device according to claim 14, wherein:
the S icon objects comprise L icon objects, L being an integer S≥L≥1,
the parameter information comprises color parameter information, and
the processor further configures the electronic device to adjust the L icon objects in the display content based on the color parameter information in response to the adjustment instruction.

16. The electronic device according to claim 15, wherein the processor further configures the electronic device to adjust a color parameter value of each of L icon objects in a display content based on the color parameter information in response to a color adjustment instruction to make each of the L icon objects present an adjusted display effect by the display, and
wherein the color parameter value of each of the L icon objects for presenting an unadjusted display effect is corresponding to a first value, the color parameter value of each of the L icon objects for presenting the adjusted display effect is corresponding to a second value, the first value of each icon object is different from the second value of each icon, and the second value of each object is within a predetermined value range, where L is an integer greater than or equal to 1.

17. The electronic device according to claim 16, wherein the processor further configures the electronic device
to acquire the color adjustment instruction while an unlocking operation instruction is acquired in the case that the electronic device is in a locked state; and
to adjust the color parameter value of each of the L icon objects in the display content based on the color parameter information in response to both the color adjustment instruction acquired and the unlocking operation instruction, wherein
the display is further configured to display each object based on the adjusted display effect after the electronic device is controlled based on the color adjustment instruction to switch from the locked state to an unlocked state.

18. The electronic device according to claim 17, wherein the processor further configures the electronic device to
display a color unlocking interface by the display, wherein the color unlocking interface displays different colors in different regions; and
acquire the color parameter information corresponding to a region selected by a user and acquire the color adjustment instruction in the case that the user slides on the color unlocking interface to trigger the unlocking operation instruction.

19. The electronic device according to claim 17, wherein the processor further configures the electronic device to:
display an unlocking color bar by the display, wherein the unlocking color bar comprises transition colors; and
acquire the color parameter information corresponding to a color selected by a user and acquire the color adjustment instruction in the case that the user slides on the unlocking color bar to trigger the unlocking operation instruction.

20. The electronic device according to claim 14, wherein the processor further configures the electronic device to:
recognize the N icon objects; determine the N icon objects of a second type and the N icon objects of a first type;
determine current transparency value of the N icon objects of a second type to be the first transparency value, and/or current transparency value of the N icon objects of a first type to be a fourth transparency value;
adjust the transparency value of the N icon objects of a first type from the fourth transparency value into the second transparency value, wherein the fourth transparency value is less than the second transparency value; and display the N icon objects among the M icon objects in the icon regions corresponding to the N icon objects based on the first transparency value of the N icon objects of a second type and the second transparency value of the N icon objects of a first type to make the portions of the background image corresponding to the N icon objects of a first type present the second display effect which is different from the first display effect.

21. The electronic device according to claim 14, wherein the electronic device is installed with J applications, where J is an integer and S≥J≥1; the electronic device comprises K components, where K is an integer equal and K≥1; the processor further configures the electronic device to:
    acquire a displaying instruction; and
    acquire the adjustment instruction via a first component by a first application of the J applications in response to the displaying instruction and adjusting the icon object of the first application in the display content based on the parameter information, an icon object of a first type corresponding to the first application and an icon object of a second type corresponding to the first application.

22. The electronic device according to claim 21, wherein the processor further configures the electronic device to:
    control a first application of J applications installed in the electronic device to acquire parameter information via a first component of K components in the electronic device in response to the displaying instruction, wherein both J and K are integers equal to or greater than 1;
    construct a first icon object based on the parameter information, an icon object of a first type corresponding to the first application and an icon object of a second type corresponding to the first application, wherein the first icon object comprises the icon object of a first type and the icon object of a second type, and the icon object of a second type in the first icon is an identifier for indicating the first application, a display mode of at least one of the first icon object of a first type and the first icon object of a second type is determined according to the parameter information; and
    display the first icon object on the display, wherein the first icon object is configured to display a first interface of the first application on the display in response to a triggering operation in the case that the triggering operation for the first icon object is acquired by the electronic device.

23. The electronic device according to claim 22, the processor further configures the electronic device to:
    before the first icon object is constructed based on the parameter information, an icon object of a first type corresponding to the first application and the icon object of a second type corresponding to the first application, determine a display mode of the icon object of a second type according to the parameter information; and/or
    determine a color range of the icon object of a first type according to the parameter information.

24. The electronic device according to claim 22, wherein the parameter information is ambient temperature information, wherein:
    in the case that the first component is a communication component, the processor further configures the electronic device to control the first application to acquire the ambient temperature information from another electronic device via the communication component; or
    in the case that the first component is a temperature sensor, the processor further configures the electronic device to control the first application to detect and acquire the ambient temperature information via the temperature sensor.

25. The electronic device according to claim 24, wherein the icon object of a first type comprises L regions, the L regions correspond to L periods in a day respectively, and the i-th region of the L regions is configured to be filled with a color corresponding to temperature parameter information in the i-th period of the L periods, wherein i is an integer between 1 and L.

26. The electronic device according to claim 22, wherein the first component is a volatile memory, and the processor further configures the electronic device to control the first application to acquire a memory space occupation ratio of the volatile memory via the volatile memory.

* * * * *